(12) United States Patent
Sy et al.

(10) Patent No.: US 9,197,637 B2
(45) Date of Patent: Nov. 24, 2015

(54) METHOD OF COMPARING PRIVATE DATA WITHOUT REVEALING THE DATA

(71) Applicant: Research Foundation of the City University of New York, New York, NY (US)

(72) Inventors: Bon K. Sy, Bayside, NY (US); Arun Prakash Kumara Krishnan, Flushing, NY (US)

(73) Assignee: Research Foundation of the City University of New York, New York, NY (US)

( * ) Notice: Subject to any disclaimer, the term of this patent is extended or adjusted under 35 U.S.C. 154(b) by 0 days.

(21) Appl. No.: 14/324,601

(22) Filed: Jul. 7, 2014

(65) Prior Publication Data
US 2014/0325230 A1   Oct. 30, 2014

Related U.S. Application Data

(63) Continuation-in-part of application No. 13/544,351, filed on Jul. 9, 2012, now Pat. No. 8,776,250.

(60) Provisional application No. 62/013,095, filed on Jun. 17, 2014, provisional application No. 61/505,562, filed on Jul. 8, 2011.

(51) Int. Cl.
| | | |
|---|---|---|
| *H04L 29/06* | (2006.01) | |
| *G06F 21/32* | (2013.01) | |
| *H04L 9/00* | (2006.01) | |
| *H04L 9/32* | (2006.01) | |

(Continued)

(52) U.S. Cl.
CPC .......... *H04L 63/0861* (2013.01); *G06F 17/10* (2013.01); *G06F 21/32* (2013.01); *G06F 21/6254* (2013.01); *G06K 9/6247* (2013.01); *H04L 9/008* (2013.01); *H04L 9/0866* (2013.01); *H04L 9/3218* (2013.01); *H04L 9/3231* (2013.01)

(58) Field of Classification Search
CPC ... H04L 63/0861; H04L 9/008; H04L 9/0866; H04L 9/3218; H04L 9/3231; G06F 17/10; G06F 21/32; G06F 21/6254; G06K 9/6247
USPC .......................................................... 713/171
See application file for complete search history.

(56) References Cited

U.S. PATENT DOCUMENTS

| | | |
|---|---|---|
| 6,301,370 B1 | 10/2001 | Steffens |
| 8,325,214 B2 | 12/2012 | Hildreth |

(Continued)

FOREIGN PATENT DOCUMENTS

WO    WO2014011633    1/2014

OTHER PUBLICATIONS

Sy, Bon K.; Sliced-based Archicture for Biometrics; Third International Conference on Biometrics; Sep. 28-30, 2009.

(Continued)

*Primary Examiner* — Michael S McNally
(74) *Attorney, Agent, or Firm* — Peter J. Mikesell; Schmeiser, Olsen & Watts, LLP

(57) ABSTRACT

Disclosed in this specification is a method and program storage device for comparing two sets of private data without revealing those private data. If the comparison deems the two data sets sufficiently similar, helper data may be provided to permit reconstruction of one of the private data sets without transmission of that private data set.

12 Claims, 8 Drawing Sheets

(51) Int. Cl.
*G06K 9/62* (2006.01)
*G06F 17/10* (2006.01)
*G06F 21/62* (2013.01)
*H04L 9/08* (2006.01)

(56) References Cited

U.S. PATENT DOCUMENTS

| | | | |
|---|---|---|---|
| 8,649,604 B2 | 2/2014 | Steinberg | |
| 8,996,886 B2 * | 3/2015 | Baughman et al. | 713/193 |
| 2008/0313135 A1 | 12/2008 | Alexe | |
| 2010/0008505 A1 | 1/2010 | Bai | |
| 2011/0099385 A1 * | 4/2011 | Takahashi | 713/186 |
| 2011/0246768 A1 * | 10/2011 | Mahmud et al. | 713/167 |
| 2013/0212655 A1 * | 8/2013 | Hoyos et al. | 726/5 |
| 2014/0270409 A1 * | 9/2014 | Hanna et al. | 382/118 |
| 2014/0283113 A1 * | 9/2014 | Hanna | 726/27 |
| 2015/0010217 A1 * | 1/2015 | Aoki | 382/124 |

OTHER PUBLICATIONS

Sy, Bon K.; SIPPA for biometric data reconstruction; Proceedings of The 2010 International Conference on Data Mining; Jul. 12-15, 2010.

Krishnan, Arun P. Kumara et al.; Parallel Secure Computation Scheme for Biometric Security and Privacy in Standard-Based BioAPI Framework; Apr. 2011.

Sy, Bon K.; Generation of Cryptographic Keys from Personal Biometrics: An Illustration Based on Fingerprints; Aug. 2012.

Sy, Bon K.; Secure Information Processing with Privacy Assurance; Eighth Annual International Conference on Privacy Security and Trust (PST); Aug. 17-19, 2010.

Krishnan, Arun P. Kumara et al.; SIPPA-2.0—Secure Information Processing with Privacy Assurance; Tenth Annual Int. Conf. on Privacy Security and Trust (PST), Jul. 2012.

USPTO (US/ISA) International Search Report from corresponding PCT Application No. PCT/US13/49724, Jan. 22, 2014 (6 pages).

Newton, E. et al. "Preserving Privacy by De-identifying Facial Images", IEEE Transactions on Knowledge and Data Engineering 17(2) Feb. 2005, pp. 232-243.

Gentry, C. "Fully Homomorphic Encryption Using Ideal Lattices" in the 41st ACM Symposium on Theory of Computing (STOC), 2009, pp. 169-178.

* cited by examiner

METHOD OF COMPARING PRIVATE DATA WITHOUT REVEALING THE DATA

CROSS-REFERENCE TO RELATED APPLICATIONS

This application is a continuation-in-part of U.S. patent application Ser. No. 13/544,351 (filed Jul. 9, 2012) which claims priority to and the benefit of U.S. provisional patent application Ser. No. 61/505,562, filed Jul. 8, 2011. This application also claims priority to and benefit of U.S. provisional patent application Ser. No. 62/013,095 (filed Jun. 17, 2014). Each of the aforementioned patent applications is hereby incorporated by reference in its entirety.

STATEMENT REGARDING FEDERALLY FUNDED RESEARCH OR DEVELOPMENT

This invention was made with government support under grant no. 80209-01 17 awarded by a PSC-CUNY Collaborative Research Award and a National Science Foundation Division of Undergraduate Education (NSF DUE) Award under grant no. 0837535. The government has certain rights in the invention.

FIELD OF THE INVENTION

This invention relates, in one embodiment, to a method of comparing a first and second private data without either original private data being revealed.

BACKGROUND

Biometric approach for authentication is appealing because of its convenience and possibility to offer security with non-repudiation. However, additional hardware, such as biometric scanners and complex software for feature extraction and biometric template matching, are required if biometric approach is to provide security for protecting sensitive data such as personal health information.

Cryptographic approach, on the other hand, ties data protection mathematically to the Key that is utilized to protect it. This allows a data owner to have complete control over one's personal information without relying on, or relinquishing control to, a third party authority. The protection of personal sensitive information is also not tied to complex software and hardware systems that may need constant patches to security holes.

Biometric authentication and authorization for data protection could be thought of as enabling security based on "what one is." The lynchpin of biometric security is the use of sufficiently unique, but often imprecise, physiological or behavioral traits to characterize an individual for authentication and identification purposes. The characterization is expressed in form of some biometric signature, which often can be reduced to some feature vector or matrix representation. For example, a biometric face could be expressed in terms of a linearized vector of EigenMap or EigenFace components. The security parameter for assessing the strength of a biometrically based approach is typically related to the size of the underlying feature vector (or matrix) and the number of bits for representing a value, as well as the biometric data distribution leading to inter and intra variability—a main source of false negative or false positive alarms when applying biometric approach for security.

On the other hand, cryptographically based security could be thought of as a security approach based on "what one knows." The lynchpin of cryptographic security is the secret key for decrypting a cipher text that is the encrypted form of the sensitive data. The security parameter for assessing the strength of a cryptographic approach is typically the key size in terms of the number of bits, and information leakage which can be measured by the information gain on the sensitive data given its corresponding cipher text and the mathematical structure of the cryptographic mechanism for encryption/decryption. In order to mitigate the risk of information leakage, semantic security is desirable.

In theory, the size of a biometric signature or the size of a secret key in cryptography could be increased indefinitely to increase the security strength. In practice, the limitation in the resolution of biometric sensors, among other factors, does not allow the security strength to be scaled proportionally. On the other hand, cryptographic approach has its own drawback too. Since the confidentiality of sensitive data is protected through encryption, one must keep the decryption key as a secret. Generally the secret key is generated and withheld by the party that handles the decryption of the sensitive data. If the secret key is compromised, the confidentiality of the sensitive data is compromised.

Therefore, an improved computational protocol which affords the advantages of both the cryptographic and biometric approaches is desired.

SUMMARY OF THE INVENTION

Disclosed in this specification is a method and program storage device for comparing two sets of private data without revealing those private data. If the comparison deems the two data sets sufficiently similar, helper data may be provided to permit reconstruction of one of the private data sets without transmission of that private data set. An advantage that may be realized in the practice of some disclosed embodiments of the system is the capability of two parties to gauge the similarity of one another's data without needing to reveal that data. In one embodiment, one party can perfectly reconstruct the other party's data without risking the data being intercepted by a third party.

In a first exemplary embodiment, a method for comparing two sets of private data without revealing the data is disclosed. The method computes a first private matrix ($A_1$) according to the equation $A_1 = d_1 \cdot d_1^T$ where $d_1$ is a first private data expressed as a column vector and $d_1^T$ is its corresponding transpose. A first eigenvalue ($\lambda_{d1}$) and a corresponding unity normalized first eigenvector ($V_{d1}$) of the first private matrix ($A_1$) is found. A second party computes a second private matrix ($A_2 = d_2 \cdot d_2^T$) and finds a second eigenvalue ($\lambda_{d2}$) and a corresponding unity normalized second eigenvector ($V_{d2}$) of the second private matrix ($A_2$). A bisector vector (x) of $V_{d1}$ and $V_{d2}$ is found without the first party or the second party revealing $d_1$, $\lambda_{d1}$, $V_{d1}$, $d_2$, $\lambda_{d2}$ or $V_{d2}$; whereas the bisector vector (x) can be obtained by solving the equation $(d_1 \cdot d_1^T + d_2 \cdot d_2^T)x = \lambda_{d1} V_{d1} + \lambda_{d2} V_{d2}$. A determination is then made concerning whether or not (1) an angular deviation between the first eigenvector ($V_{d1}$) and the second eigenvector ($V_{d2}$) is within a threshold, or (2) a distance between $V_{d1}$ and $V_{d2}$ is within a threshold, wherein if the threshold is satisfied, the first private data and second private data are deemed sufficiently similar.

In a second exemplary embodiment, a method for comparing two sets of private data without revealing the data and reconstructing one of the private data sets is disclosed. The method computes a first private matrix ($A_1$) according to the equation $A_1 = d_1 \cdot d_1^T$ where $d_1$ is a first private data expressed as a column vector and $d_1^T$ is its corresponding transpose. A first eigenvalue ($\lambda_{d1}$) and a corresponding unity normalized first eigenvector ($V_{d1}$) of the first private matrix ($A_1$) are found. A second party computes a second private matrix ($A_2=d_2 \cdot d_2^T$) and finds a second eigenvalue ($\lambda_{d2}$) and a corresponding unity normalized second eigenvector ($V_{d2}$) of the second private matrix ($A_2$). A bisector vector (x) of $V_{d1}$ and $V_{d2}$ is found without the first party or the second party revealing $d_1, \lambda_{d1}, V_{d1}, d_2, \lambda_{d2}$ or $V_{d2}$; whereas the bisector vector (x) can be obtained by solving the equation $(d_1 \cdot d_1^T + d_2 \cdot d_2^T)x = \lambda_{d1}V_{d1} + \lambda_{d2}V_{d2}$. A determination is then made concerning whether or not (1) an angular deviation between the first eigenvector ($V_{d1}$) and the second eigenvector ($V_{d2}$) is within a threshold, or (2) a distance between $V_{d1}$ and $V_{d2}$ is within a threshold, wherein if the threshold is satisfied, the first private data and second private data are deemed sufficiently similar. If the data is sufficiently similar, helper data that includes $\lambda_{d2}$ plus a mathematical operator is sent that permits the first party to reconstruct the second party's private data by combining the helper data with the first private data.

In a third exemplary embodiment, a program storage device is disclosed that tangibly embodies a program of instructions executable by machine to perform the method steps for comparing two sets of private data without revealing the data and reconstructing one of the private data sets. The method computes a first private matrix ($A_1$) according to the equation $A_1 = d_1 \cdot d_1^T$ where $d_1$ is a first private data expressed as a column vector and $d_1^T$ is its corresponding transpose. A first eigenvalue ($\lambda_{d1}$) and a corresponding unity normalized first eigenvector ($V_{d1}$) of the first private matrix ($A_1$) is found. A second party computes a second private matrix ($A_2 = d_2 \cdot d_2^T$) and finds a second eigenvalue ($\lambda_{d2}$) and a corresponding unity normalized second eigenvector ($V_{d2}$) of the second private matrix ($A_2$). A bisector vector (x) of $V_{d1}$ and $V_{d2}$ is found without the first party or the second party revealing $d_1, \lambda_{d1}, V_{d1}, d_2, \lambda_{d2}$ or $V_{d2}$; whereas the bisector vector (x) can be obtained by solving the equation $(d_1 \cdot d_1^T + d_2 \cdot d_2^T)x = \lambda_{d1}V_{d1} + \lambda_{d2}V_{d2}$. A determination is then made concerning whether or not (1) an angular deviation between the first eigenvector ($V_{d1}$) and the second eigenvector ($V_{d2}$) is within a threshold, or (2) a distance between $V_{d1}$ and $V_{d2}$ is within the threshold, wherein if the threshold is satisfied, the first private data and second private data are deemed sufficiently similar. If the data is sufficiently similar, helper data that includes $\lambda_{d2}$ plus a mathematical operator is sent that permits the first party to reconstruct the second party's private data by combining the helper data with the first private data.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

In one embodiment, a method for permitting two parties to compare digitally stored private data (e.g. a first and second biometric signature, such as a fingerprint) is provided without either party revealing their respective data. In another embodiment, when the comparison deems the two data sets are sufficiently similar, helper data is provided to the other party that permits the other party to accurately reconstruct the other party's data by combining the helper data with their own data. The data sets are never exchanged. In the event the helper data is intercepted by an undesirable third party, the third party is unable to reconstruct either data set, as they lack a sufficiently similar data set that must be combined with the helper data.

Comparing Private Data Without Revealing the Data

Figure 1:
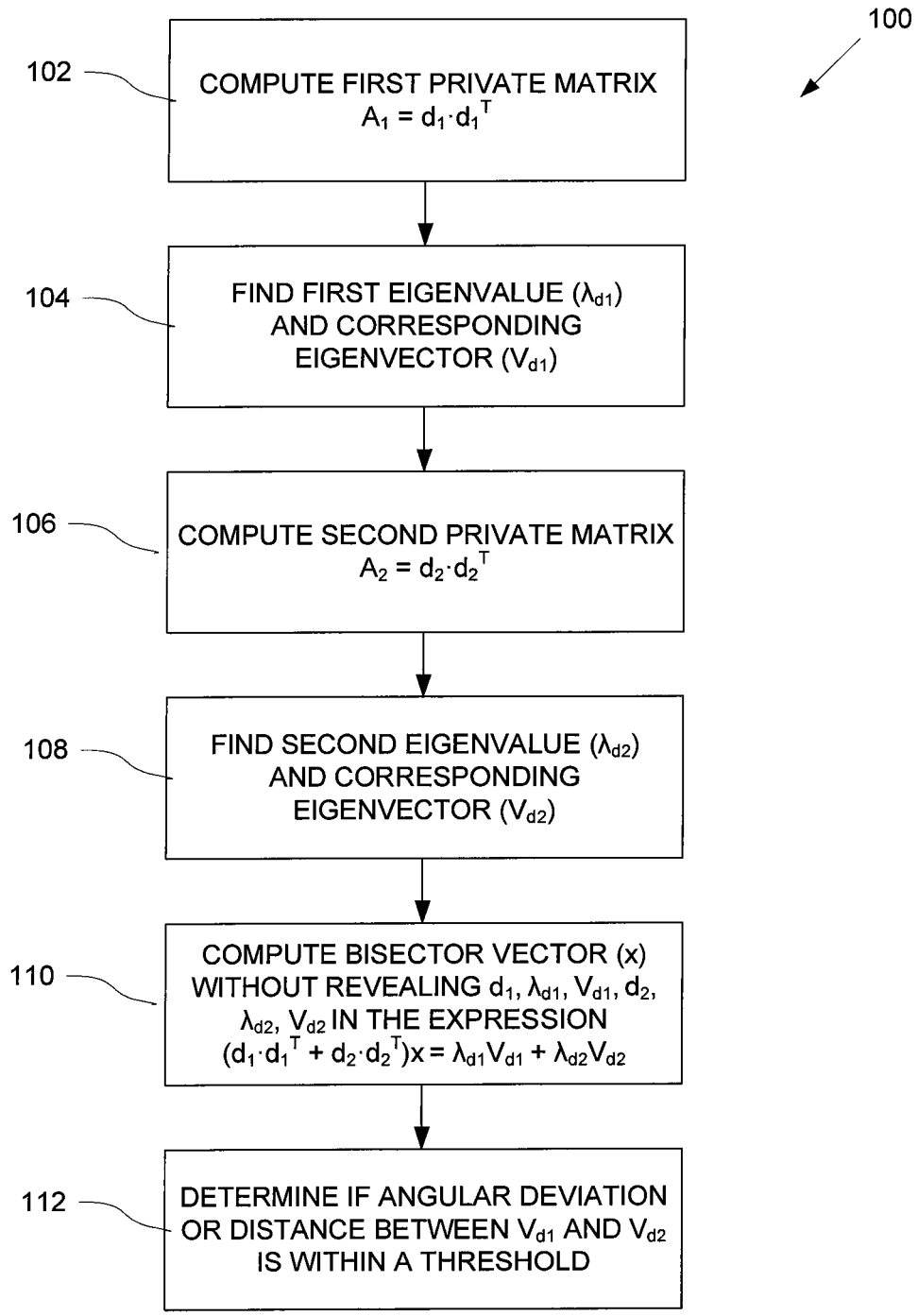
FIG. 1 depicts of a flow diagram of method 100 for comparing digitally stored private data without revealing the data.

FIG. 1 depicts of a flow diagram of method 100 for comparing digitally stored private data without revealing the data. This method may be referred to as the Secure Information Processing with Privacy Assurance (SIPPA) protocol.

In step 102, a first party computes a first private matrix ($A_1$) by multiplying a first private data ($d_1$), such as a digital biometric signature, with its transpose ($d_1^T$). The first private matrix $A_1$ is therefore ($d_1 \cdot d_1^T$). The first private data is expressed as a column vector. In one embodiment, the first party is a client party in a client/server relationship. Examples of first parties include client computers that are in communication with a server. In one embodiment, the first party is a digital audio recorder, digital scanner, cellular telephone, or other similar device that transmits a Device ID (DID). Private data may include personal biometric traits, video surveillance data, and the like. Personal biometric traits include fingerprints, facial features (e.g. facial recognition), voice patterns, and the like and may be referred to as a biometric ID (BID) and a sample thereof referred to as a biometric sample (S).

In step 104, at least one first eigenvalue ($\lambda_{d1}$) and at least one corresponding first eigenvector ($V_{d1}$) is calculated for the first private matrix ($A_1$). In one embodiment, step 104 calculates the most significant eigenvalue and its corresponding unity-normalized eigenvector of the first private matrix ($A_1$). A most significant eigenvalue is the eigenvalue with the largest magnitude (e.g. $\lambda_{dk} \geq$ every $\lambda_{d1}$ for $1=1 \ldots n$ except $1 \neq k$ for the set $\{\lambda_{d1} \ldots \lambda_{dn}\}$. When multiple eigenvalues tie as the largest magnitude, each is a most significant eigenvalue.

In step 106, a second party computes a second private matrix ($A_2$) by multiplying a second private data ($d_2$) with its transpose ($d_2^T$). The second private matrix $A_2$ is therefore ($d_2 \cdot d_2^T$). The second private data is expressed as a column vector. In one embodiment, the second party is a server party in a client/server relationship. Examples of second parties include server computers (e.g., a fingerprint database server computer) that are in communication with the client.

In step 108, at least one second eigenvalue ($\lambda_{d2}$) and at least one corresponding second eigenvector ($V_{d2}$) is calculated for the second private matrix ($A_2$). In one embodiment, step 108 calculates the most significant eigenvalue and its corresponding unity-normalized eigenvector of the second private matrix ($A_2$).

In step 110 a bisector vector (x) of the equation $(d_1 \cdot d_1^T + d_2 \cdot d_2^T)x = \lambda_{d1} V_{d1} + \lambda_{d2} V_{d2}$ is computed. As described in detail elsewhere in this specification, the bisector vector (x) can be collaboratively calculated by the first party and the second party without the first party or the second party revealing $d_1$, $\lambda_{d1}$, $V_{d1}$, $d_2$, $\lambda_{d2}$ or $V_{d2}$.

Either or both parties can use the bisector vector (x), combined with their own data ($\lambda d_1 V_{d1}$ or $\lambda_{d2} V_{d2}$) to find a vector (e). As described in detail elsewhere in this specification, due to the relationship of the bisector vector (x), $V_{d1}$ and $V_{d2}$ in Eigen-space, the vector (e) is an indicator of the similarity of the underlying data $d_1$ and $d_2$, yet neither the first party nor the second party has revealed $d_1$ or $d_2$. The party that wishes to determine the deviation between its eigenvector and the other party's eigenvector can do so utilizing bisector vector (x). Suppose that the party with $V_{d1}$ wishes to determine the angular deviation between $V_{d1}$ and $V_{d2}$, this can be done by obtaining the angle between $V_{d1}$ and bisector vector (x). (i.e.; $\cos^{-1}(V_{d1} \cdot x(|V_{d1}| \cdot |x|)))$. The angular deviation between $V_{d1}$ and $V_{d2}$ is then $2*(\cos^{-1}(V_{d1} \cdot x(|V_{d1}| \cdot |x|)))$. In another embodiment, the estimated magnitude distance between $V_{d1}$· and $V_{d2}$· via the magnitude distance between $V_{d1}/V_{d2}$ and x is used instead of, or in addition to, the angular deviation.

In step 112, if $d_1$ and $d_2$ are sufficiently similar as determined by either the angular distance or other distance measure such as the Euclidean distance between vectors $V_{d1}$ and $V_{d2}$ as compared against a pre-defined threshold, then subsequent processing steps can be performed such as sending helper data (e.g., sending $X_{d1}/d_1^T \cdot x$ to the second party). If the deviation measure is not within a certain pre-defined threshold, each party's data, $d_1$ and $d_2$, are deemed dissimilar and alternate subsequent processing steps may be performed. In one embodiment, when each party's data are sufficiently similar, helper data is provided to permit one party to reconstruct the other party's data—yet that data is never exchanged and is therefore not at risk of being intercepted.

Angular or Magnitude Deviation as an Indicator of Similarity

Figure 2:
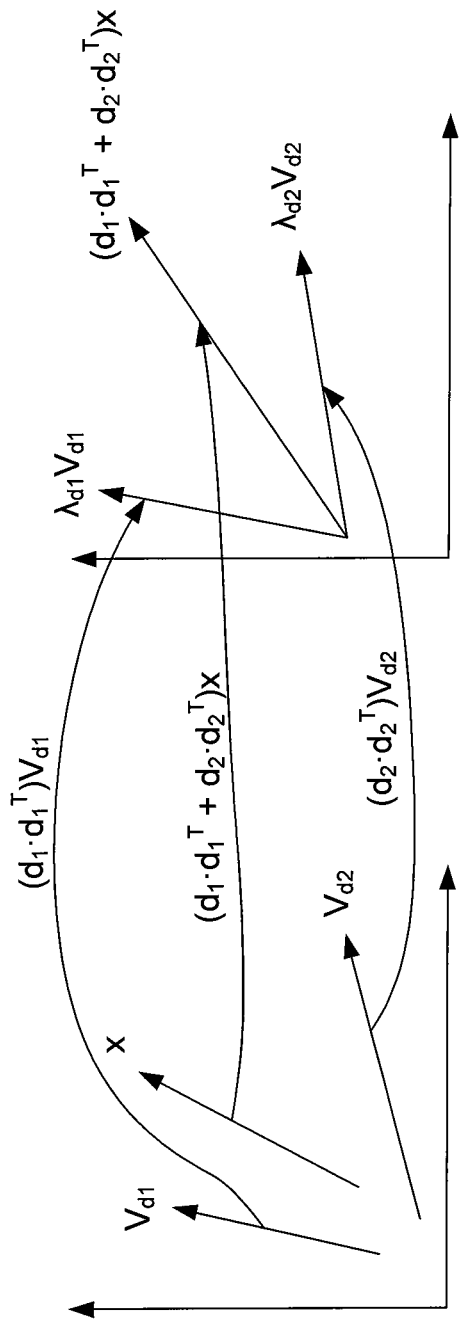
FIG. 2 illustrates the convergence of $V_{d1}$, $V_{d2}$ and x when $d_1$ and $d_2$ converge.
Figure 3:
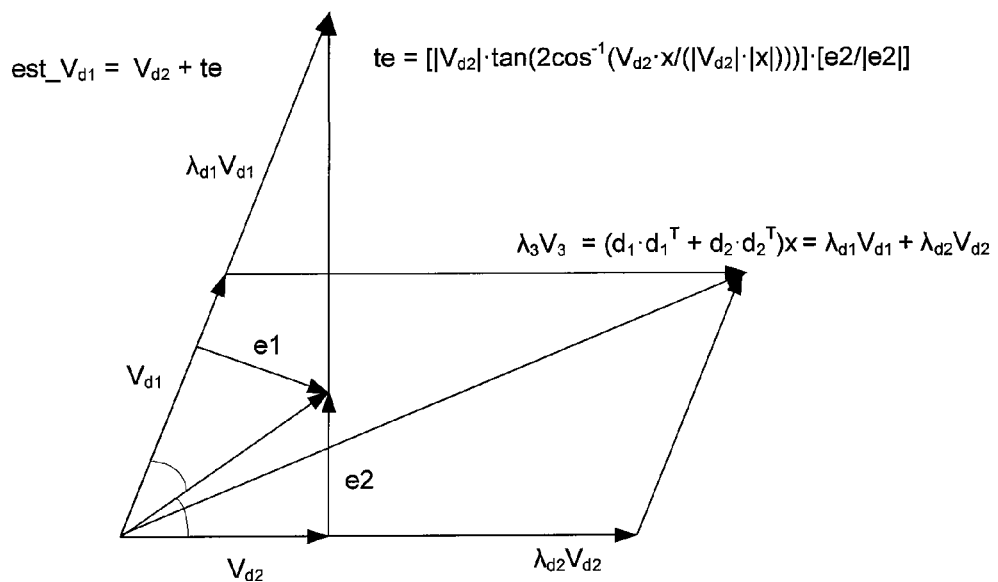
FIG. 3 depicts the geometric relationship of $V_{d1}$, $V_{d2}$ and x.

As shown in FIG. 2 and FIG. 3; $V_{d1}$, $V_{d2}$ and x all converge to each other when $d_1$ and $d_2$ converge to each other. This convergence gives rise to a geometric relationship between the eigenvectors that permits one to use the vector (e) (either $e_1$ for the first party or $e_2$ for the second party) to determine whether $V_{d1}$ and $V_{d2}$ are sufficiently similar or are dissimilar. The first party can solve for $e_1$. If $e_1$ is sufficiently small (e.g. below a predetermined threshold) then the first party knows the second party's data must be similar due to the fact that $V_{d1}$ and $V_{d2}$ each is a unity normalized eigenvector and x their bisector, yet the first party cannot learn anything more. Likewise, the second party can solve for $e_2$ and, by examining $e_2$, determine whether or not the first party's data is sufficiently similar to its own data.

The private matrices $A_1 = d_1 \cdot d_1^T$ and $A_2 = d_2 \cdot d_2^T$ can be thought of as the mapping functions for the eigenvectors and the bisector vector x. The difference between $d_1$ and $d_2$ proportionality affects the difference in the mapping functions, which subsequently introduces an angular deviation on the angle between the unity normalized eigenvectors as well as the magnitude deviation as measured by the Euclidean distance between the two eigenvectors scaled by the corresponding eigenvalues. Therefore, angular deviation and magnitude deviation between the client and server eigenvectors can be used to obtain information about the closeness between target and source data. If angular deviation is used as the metric to determine closeness, then both the first party and the second party can privately and precisely determine whether the data of the other party is sufficiently similar without revealing one's own private data. See the section entitled "Reconstructing private data without revealing the data."

Securely Calculating the Bisector Vector (x)

Consider $(d_1 \cdot d_1^T + d_2 \cdot d_2^T)x = \lambda_{d1} V_{d1} + \lambda_{d2} V_{d2}$, the solution x=V satisfying $(d_1 \cdot d_1^T + d_2 \cdot d_2^T)V = \lambda_{d1} V_{d1} + \lambda_{d2} V_{d2}$ has a unity scalar projection onto the unity normalized $V_{d1}$ and $V_{d2}$, and the vector (x) is a bisector for the interior angle between $V_{d1}$ and $V_{d2}$ according to Theorem 1. See the section entitled "Proof of theorem 1." Theorem 1 shows that there is an algebraic relationship between the symmetric matrix representation of the first party and second party data in the eigenvector space; and the algebraic relationship guarantees the existence of a bisector vector that allows each party to use it to determine whether the first and second party data are sufficiently similar. A variety of protocols can be used to securely calculate the bisector vector (x) without revealing information about either party's private data including $d_1$, $\lambda_{d1}$, $V_{d1}$, $d_2$, $\lambda_{d2}$ or $V_{d2}$.

In one embodiment, the bisector vector (x) is calculated using the Secure Linear System Solution Protocol (SLSSP). In another embodiment, the bisector vector (x) is calculated using the Privacy-preserving cooperative scientific computation protocol (PPCSC). Both these protocols are discussed elsewhere in this specification.

Brief Primer on an Encryption Function

An ideal encryption function E(p,k) is a one way function which takes in two arguments (p, k) and produces an unique c for each unique (p, k) pair. Where p is some data and k is a key. In the ideal case, if one were to know only the output of E(p,k)=c, and seeks to obtain either p or k, the only recourse available would be an exhaustive search; i.e. one would have to iterate through all the possibilities of p and k, to see if any one combination of (p, k) produces the c, thus obtaining the p or k they seek. An ideal encryption function should also allow for the obtainment of p if c and k are known with relative ease.

Encryption functions are utilized extensively to securely transport secrets primarily over channels where there exists the possibility for an intruder who might be able to intercept the secret. The existence of relatively ideal encryption functions allow for the transport of secrets, where even if the encrypted secret were to be intercepted by a nefarious party (without the knowledge of k) it would take a very long time to obtain p (billions of years using the fastest available computes—if a relatively large k were chosen).

SLSSP Protocol Details

Example

SLSSP primarily utilizes the well-known publically available Paillier additively homomorphic encryption function. The Paillier protocol allows for the following and is thus called an additively homomorphic function. See the section entitled "Paillier Cryptosystem" elsewhere in this specification.

Suppose the following scenario: Multiple persons $\{P_1, P_2, P_3 \ldots P_n\}$ would like to vote yes/no for a candidate. It is desirable that the identity of the person who cast any particular vote remain private. Each person $P_i$, possesses a vote $V_i$, which is either 0 or 1, Paillier allows each party to encrypt their vote, where the tally $(T=V_1+V_2+V_3+ \ldots +V_n)$ can be computed without knowledge of the specific value of any of the votes. Specifically, the Paillier function allows some party C (who chooses a secret key k) to send E(n1,k) (a number n1 encrypted in Paillier which can be decrypted with key k) and E(n2,k) to another party D, so that it may perform the operation E (n3,k)=add(E(n1,k), E(n2,k)), where E(n3,k)=E(n1+n2,k). Party C which receives E(n3,k) can obtain n3=n1+n2 because it knows k. Paillier guarantees that party D cannot, even with very large amounts of time (billions of years), know n3 nor k nor n1 nor n2.

This SLSSP protocol allows for two parties (a first party and second party) to jointly solve for x in the following equation (A1+A2)x=b1+b2

A1 is a square matrix and b1 is a column vector with the same row dimension as A1. Both A1 and b1 are private to the first party. A2 is a square matrix and b2 is a column vector with the same row dimension as A2. Both A2 and b2 are private to the second party. A1 and A2 are of the same dimension.

Figure 4:
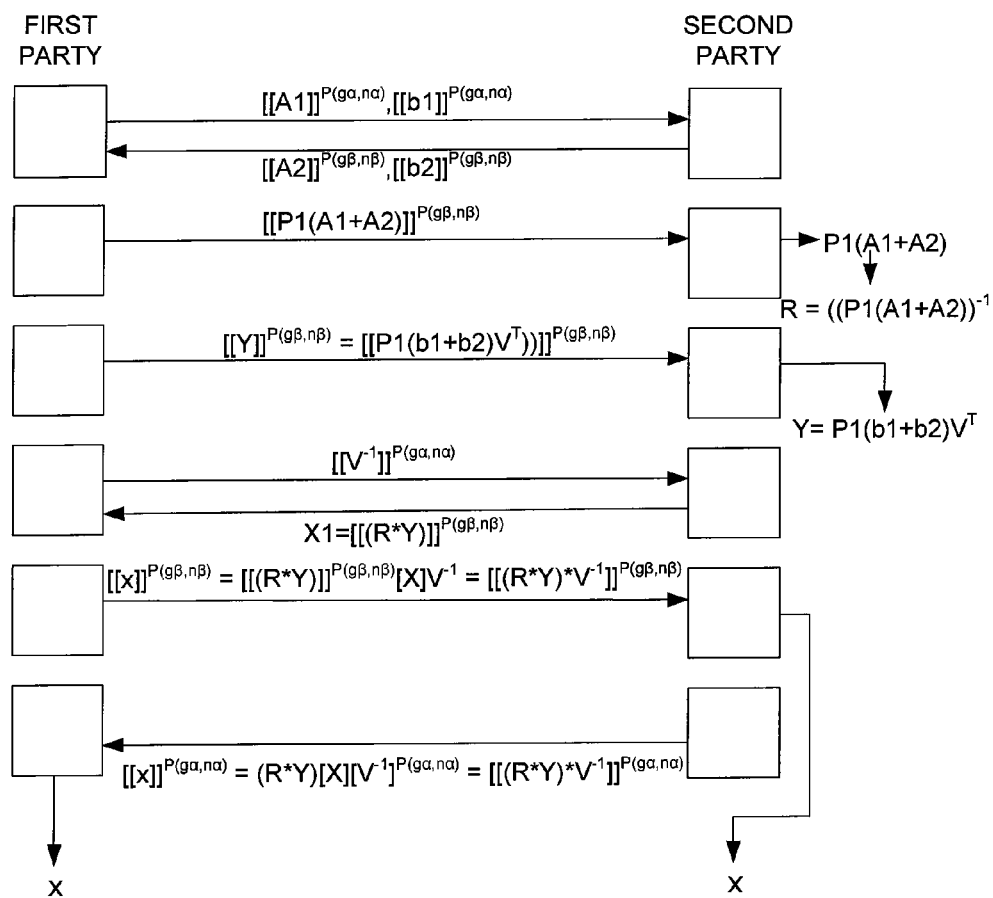
FIG. 4 is a schematic diagram depicting an exemplary method for solving for x.

This protocol, summarized in Table 1 and FIG. 4, allows for the solution x to be obtained by both parties without each party revealing to the other their respective private data i.e. A1, b1 is not revealed to the second party, and A2, b2 is not revealed to the first.

The following is a numeric illustration of this protocol using exemplary numeric values. It should be understood this non-limiting example is including solely for clarity of illustration. For this illustration, the following is an inventory of what the first party and the second party possess:

The first party possesses:

A $2 \times 2$ private matrix $A1 = \begin{bmatrix} 32 & 4 \\ 12 & 19 \end{bmatrix}$ A $2 \times 1$ private matrix $b1 = \begin{bmatrix} 11 \\ 3 \end{bmatrix}$ A randomly generated $2 \times 2$ matrix $P1 = \begin{bmatrix} 13 & 17 \\ 51 & 8 \end{bmatrix}$ A randomly generated $1 \times 2$ matrix $v^t = [4 \; 43]$ A randomly generated Paillier key $K_A$ The second party possesses:

A $2 \times 2$ private data matrix $A2 = \begin{bmatrix} 67 & 74 \\ 19 & 21 \end{bmatrix}$ A $2 \times 1$ private data matrix $b2 = \begin{bmatrix} 54 \\ 83 \end{bmatrix}$ A randomly generated $2 \times 2$ matrix $P2 = \begin{bmatrix} 49 & 68 \\ 55 & 9 \end{bmatrix}$ A randomly generated Paillier key $K_B$

| Step # | First Party | Step # | Second Party |
|---|---|---|---|
| α1 | Send $E(A1, K_A)$ and $E(b1, K_A)$ to SECOND PARTY.<br>Numerically:<br>Send $E\left(\begin{bmatrix} 32 & 4 \\ 12 & 19 \end{bmatrix}, K_A\right)$ and $E\left(\begin{bmatrix} 11 \\ 3 \end{bmatrix}, K_A\right)$<br>to SECOND PARTY. | β1 | Receive $E(A1, K_A)$ and $E(b1, K_A)$ from FIRST PARTY.<br>Numerically:<br>Receive $\left(\begin{bmatrix} 32 & 4 \\ 12 & 19 \end{bmatrix}, K_A\right), E\left(\begin{bmatrix} 11 \\ 3 \end{bmatrix}, K_A\right)$<br>from FIRST PARTY. |
| α2 | Receive $E(A2, K_B)$ and $E(b2, K_B)$ from SECOND PARTY.<br>Numerically:<br>Receive $\left(\begin{bmatrix} 67 & 74 \\ 19 & 21 \end{bmatrix}, K_B\right), E\left(\begin{bmatrix} 54 \\ 83 \end{bmatrix}, K_B\right)$<br>from SECOND PARTY. | β2 | Send $E(A2, K_B)$ and $E(b2, K_B)$ to FIRST PARTY.<br>Numerically:<br>Send $E\left(\begin{bmatrix} 67 & 74 \\ 19 & 21 \end{bmatrix}, K_B\right)$ and $E\left(\begin{bmatrix} 54 \\ 83 \end{bmatrix}, K_B\right)$<br>to FIRST PARTY. |
| α3 | Compute and send to SECOND PARTY:<br>$E(P1(A1 + A2), K_B)$<br>Numerically:<br>Compute and send to SECOND PARTY:<br>$E\left(\begin{bmatrix} 13 & 17 \\ 51 & 8 \end{bmatrix}\left(\begin{bmatrix} 32 & 4 \\ 12 & 19 \end{bmatrix} + \begin{bmatrix} 67 & 74 \\ 19 & 21 \end{bmatrix}\right), K_B\right) =$<br>$E\left(\begin{bmatrix} 1814 & 1694 \\ 5297 & 4298 \end{bmatrix}, K_B\right)$ | β3 | Receive and decrypt matrix obtained from step α3 to obtain a mXm matrix:<br>$(P1(A1 + A2))$<br>Numerically:<br>Receive and decrypt matrix obtained from step α3 to obtain a mXm matrix:<br>$\begin{bmatrix} 1814 & 1694 \\ 5297 & 4298 \end{bmatrix}$ |
| α4 | Compute $E(Y, K_B) = E(P1(b1 + b2)v^t, K_B)$<br>Numerically:<br>Compute:<br>$E(Y, K_B) =$<br>$E\left(\begin{bmatrix} 13 & 17 \\ 51 & 8 \end{bmatrix}\left(\begin{bmatrix} 11 \\ 13 \end{bmatrix} + \begin{bmatrix} 54 \\ 83 \end{bmatrix}\right)[4, 43], K_B\right) =$<br>$E\left(\begin{bmatrix} 9228 & 99201 \\ 16012 & 172129 \end{bmatrix}, K_B\right)$ | β4 | Compute the Moore-Penrose Pseudoinverse (A type of matrix inverse) of $(P1(A1 + A2))$ to obtain $R = ((P1(A1 + A2)))^{-1}$<br>Numerically:<br>$R = \begin{bmatrix} 1814 & 1694 \\ 5297 & 4298 \end{bmatrix}^{-1} = \begin{bmatrix} -0.037 & 0.0014 \\ 0.0045 & -0.0015 \end{bmatrix}$ |
| α5 | Send $E(Y, K_B)$ to SECOND PARTY:<br>Numerically:<br>Send to SECOND PARTY: | β5 | Receive from FIRST PARTY (Step α5), and decrypt to obtain $Y = P1(b1 + b2)v^T$<br>Numerically:<br>Receive from FIRST PARTY (Step α5), and decrypt to obtain |

| Step # | First Party | Step # | Second Party |
|---|---|---|---|
| | $E(Y, K_B) = E\left(\begin{bmatrix} 9228 & 99201 \\ 16012 & 172129 \end{bmatrix}, K_B\right)$ | | $Y = \begin{bmatrix} 9228 & 99201 \\ 16012 & 172129 \end{bmatrix}$ |
| α6 | Send $E((v^t)^{-1}, K_A)$, to SECOND PARTY, where $(v^t)^{-1}$ is the Moore-Penrose Pseudoinverse (A type of matrix inverse) of $(v^t)$) Numerically: Send to SECOND PARTY: $E((v^t)^{-1}, K_A) = E\left(\begin{bmatrix} 0.0021 \\ 0.0231 \end{bmatrix}, K_A\right)$ | β6 | Receive $E((v^t)^{-1}, K_A)$ from step α6 and compute X1, utilizing Y. Send $E(X1, K_B)$ to FIRST PARTY. $E(X1, K_B) = E((R * Y), K_B)$ Numerically: Send to FIRST PARTY: $E(X1, K_B) = E((R*Y), K_B) =$ $E\left(\left(\begin{bmatrix} -0.037 & 0.0014 \\ 0.0045 & -0.0015 \end{bmatrix} * \begin{bmatrix} 9228 & 99201 \\ 16012 & 172129 \end{bmatrix}\right), K_B\right) =$ $E\left(\left(\begin{bmatrix} -10.6563 & -114.5551 \\ 16.8586 & 181.2302 \end{bmatrix}\right), K_B\right)$ |
| α7 | Receive $E(X1, K_B)$ from SECOND PARTY, (step β6) and compute the encrypted solution $E(x, K_B)$ by multiplying $(v^t)^{-1}$ to $E(X1, K_B)$ i.e. $E(x, K_B) = E(X1 * (v^t)^{-1}, K_B)$ Numerically: $E(x, K_B) = E(X1*(v^t)^{-1}, K_B) =$ $E\left(\begin{bmatrix} -10.6563 & -114.5551 \\ 16.8586 & 181.2302 \end{bmatrix} * \begin{bmatrix} 0.0021 \\ 0.0231 \end{bmatrix}, K_B\right) =$ $E(x, K_B) = E\left(\begin{bmatrix} -2.6641 \\ 4.2147 \end{bmatrix}, K_B\right)$ | β7 | Compute the encrypted solution $E(x, K_A)$ by multiplying $(R*Y)$ to $E((v^t)^{-1}, K_A)$ i.e. $E(x, K_A) = E(R*Y*(v^t)^{-1}, K_A)$ Numerically: $E(x, K_A) = E(R*Y*(v^t)^{-1}, K_A) =$ $E(R*Y*(v^t)^{-1}, K_A) =$ $E\left(\begin{bmatrix} -0.037 & 0.0014 \\ 0.0045 & -0.0015 \end{bmatrix} * \begin{bmatrix} 9228 & 99201 \\ 16012 & 172129 \end{bmatrix} * \begin{bmatrix} 0.0021 \\ 0.0231 \end{bmatrix}, K_A\right) =$ $E(x, K_B) = E\left(\begin{bmatrix} -2.6641 \\ 4.2147 \end{bmatrix}, K_A\right)$ |
| α8 | Send $E(x, K_B)$ to SECOND PARTY Numerically: Send to SECOND PARTY $E\left(\begin{bmatrix} -2.6641 \\ 4.2147 \end{bmatrix}, K_B\right)$ | β8 | Receive $E(x, K_B)$ from FIRST PARTY (Step α8) and decrypt to obtain the solution x Numerically: $x = \begin{bmatrix} -2.6641 \\ 4.2147 \end{bmatrix}$ |
| α9 | Receive $E(x, K_A)$ from FIRST PARTY (Step β9) and decrypt to Obtain the solution x Numerically: $x = \begin{bmatrix} -2.6641 \\ 4.2147 \end{bmatrix}$ | β9 | Send $E(x, K_A)$ to FIRST PARTY Numerically: Send to FIRST PARTY $E\left(\begin{bmatrix} -2.6641 \\ 4.2147 \end{bmatrix}, K_A\right)$ |

To numerically verify the solution:

$$(A1 + A2)*x = \left(\begin{bmatrix} 32 & 4 \\ 12 & 19 \end{bmatrix} + \begin{bmatrix} 67 & 74 \\ 19 & 21 \end{bmatrix}\right) * \begin{bmatrix} -2.6641 \\ 4.2147 \end{bmatrix} = \begin{bmatrix} 65 \\ 86 \end{bmatrix}$$

$$(b1 + b2) = \begin{bmatrix} 65 \\ 86 \end{bmatrix}$$

Privacy-Preserving Cooperative Scientific Computation Protocol

The definitions for left and right homomorphic encryption over matrices are listed below before we present the privacy-preserving cooperative scientific computation protocol:

Definition 1: Given a scalar secret key k, and a scalar message m, homomorphic encryption, denoted by $E(k,m)$, is an encryption with the following properties: $E(k,m)^c = E(k, mc)$, $E(k,m1) \cdot E(k,m2) = E(k, m1+m2)$; where c is a scalar constant.

Definition 2: A simple homomorphic encryption is a homomorphic encryption with the mathematical formulation $E(k,m) = k^m$.

Definition 3: Given a scalar secret key k, and a m×m matrix message $A = [a_{ij}]_{i=1 \ldots m, j=1 \ldots m}$, a left homomorphic encryption, denoted by $E_L(k,M)$, is an encryption satisfying two properties:

$$E_L(k,A)^B = E(k, B \cdot A) = E(k, [(\Sigma_j b_{ij} a_{jk})_{ik}]_{i=1 \ldots m, k=1 \ldots m}) \quad (i)$$

$$E(k,A) \cdot E(k,B) = E(k, A+B); \text{ where } B = [b_{ij}]_{i=1 \ldots m, j=1 \ldots m} \text{ is a } m \times m \text{ matrix} \quad (ii)$$

Definition 4: Given a scalar secret key k, and a m×n matrix message $A = [a_{ij}]_{i=1 \ldots m, j=1 \ldots m}$, a right homomorphic encryption, denoted by $E_R(k,A)$, is an encryption satisfying two properties:

$$E_R(k,A)^B = E(k, A \cdot B) = E(k, [(\Sigma_j a_{ij} b_{jk})_{ik}]_{i=1 \ldots m, k=1 \ldots m}) \quad (i)$$

$$E(k,A) \cdot E(k,B) = E(k, A+B); \text{ where } B = [b_{ij}]_{i=1 \ldots m, j=1 \ldots m} \text{ is a } m \times m \text{ matrix}. \quad (ii)$$

Algorithm 1: Realization of left homomorphic operation $E_L(k,A)^B = E(k, B \cdot A) = E(k, [(\Sigma_j b_{ij} a_{ik})_{ik}]_{i=1 \ldots m, k=1 \ldots m})$ In the first step, P1 sends P2, one at a time, $E(k, a_{ij}) = k^{a_{ij}}$, where $i = 1 \ldots m$, $j = 1 \ldots m$. In the second step, compute for $i = 1 \ldots m$, $k = 1 \ldots m$ $$\prod_{j=1}^{m} E(k, a_{jk})^{b_{ij}} = \prod_{j=1}^{m} k^{b_{ij}a_{jk}} = k^{\sum_{j=1}^{m} b_{ij}a_{jk}} = E\left(k, \sum_{j=1}^{m} b_{ij}a_{jk}\right)$$

In the third step, a matrix is constructed.

$$\left[\left(E\left(k, \sum_{j=1}^{m} b_{ij}a_{jk}\right)\right)\right]_{i,k \, i=1 \ldots m, k=1 \ldots m} = E(k, B \cdot A)$$

Algorithm 2: Realization of right homomorphic operation $E_R(k,A)^B = E(k, A \cdot B) = E(k, [(\Sigma_j a_{ij} b_{jk})_{ik}]_{i=1 \ldots m, k=1 \ldots m})$.

In the first step, P1 sends P2, one at a time, $E(k, a_{ij}) = k^{a_{ij}}$, where $i=1 \ldots m, j=1 \ldots m$. In the second step, compute for $i=1 \ldots m, k=1 \ldots m$.

$$\prod_{j=1}^{m} E(k, a_{ij})^{b_{jk}} = \prod_{j=1}^{m} k^{a_{ij}b_{jk}} = k^{\sum_{j=1}^{m} a_{ij}b_{jk}} = E\left(k, \sum_{j=1}^{m} a_{ij}b_{jk}\right)$$

In the third step, a matrix is constructed.

$$\left[\left(E\left(k, \sum_{j=1}^{m} a_{ij}b_{jk}\right)\right)\right]_{i,k \, i=1 \ldots m, k=1 \ldots m} = E(k, A \cdot B)$$

Privacy-preserving cooperative scientific computation (PPCSC) is a conventional protocol that solves a two-party secure computation problem leading to a value of x satisfying (A1+A2)x=b1+b2. Where matrix A1 and vector b1 belong to party P1, matrix A2 and vector b2 belong to party P2. At the end of protocol, both parties know the solution x while no party knows the other's party's private inputs, i.e. in this case, party P1 cannot derive A2 nor b2, and party P2 cannot derive A1 nor b1.

PPCSC Protocol formulation: 2-party secure computation protocol for solving the algebraic system $(\Sigma_{i=1,2} A_i)x = \Sigma_{i=1,2} b_i$.

Instead of solving directly $(\Sigma_{i=1,2} A_i)x = \Sigma_{i=1,2} b_i$, we instead solve $P_1(A_1+A_2)P_2 y = P_1(b_1+b_2) \Leftrightarrow P_1(A_1+A_2)x = P_1(b_1+b_2)$, and recover x from $P_2 y$; where $P_1$ and $P_2$ are random matrices generated by party 1 and party 2 respectively. By applying Singular Value Decomposition to $P_1$ and $P_2$, we obtain $P_1 = U_1 S_1 V_1^T$ and $P_2 = U_2 S_2 V_2^T$; where $U_i^T U_i = V_i V_i^T = I$ (identity matrix), and $S_i$ are diagonal matrices; for i=1,2. The process of 2-party secure computation for solving $P_1(A_1+A_2)P_2 x = P_1(b_1+b_2)$ is realized as below:

P1: (Party 1), P2: (Party 2)
Step 1 Content: $V_1^T A_1$
Sender: P1 with $(A_1, b_1, P_1 = U_1 S_1 V_1^T)$ Receiver: P2
Step 2 Content: $E_L(k_2, V_1^T A_1 U_2 S_2), E_L(k_2, A_2 U_2 S_2)$
Sender: P2 with $(A_2, b_2, P_2 = U_2 S_2 V_2^T)$ Receiver: P1
Step 3 Content: $E_L(k_2, V_1^T A_1 U_2 S_2)^{U_1 S_1} \cdot E_L(k_2, A_2 U_2 S_2)^{P_1} = E_L(k_2, P_1(A_1+A_2)U_2 S_2)$
Sender: P1 with $(A_1, b_1, P_1)$ Receiver: P2
Remark: P2 can construct $P_1(A_1+A_2)P_2$ by decrypting $LE(k_2, P_1(A_1+A_2)U_2 S_2)$ and multiplying the decrypted outcome with $V_2^T$
Step 4 Content: $E_R(k_1, c_1 P_1 b_1), E_R(k_1, c_1 P_1)$ where $c_1$ is a random scalar generated by party P1
Sender: P1 with $(A_1, b_1, P_1, c_1)$ Receiver: P2

Step 5 Content: $E_R(k_1, c_1 P_1 b_1)^{c_2} \cdot E_R(k_1, c_1 P_1)^{c_2 b_2} = E_R(k_1, c_1 c_2 P_1(b_1+b_2))$ where $c_2$ is a random scalar generated by party P2
Sender: P2 with $(A_2, b_2, P_2, c_2)$ Receiver: P1
Step 6 Content: $c_2 P_1(b_1+b_2)$
Sender: P1 with $(A_1, b_1, P_1, c_1)$ Receiver: P2
Remark: From step 3 and 6, P2 constructs $P_1(A_1+A_2) P_2 x = P_1(b_1+b_2)$ and solves x.

Reconstructing Private Data Without Revealing the Data

We have now discussed SLSSP and PPCSC protocols. We now will discuss the reconstruction of private data without revealing the data using SLSSP/PPCSC protocols.

Figure 5:
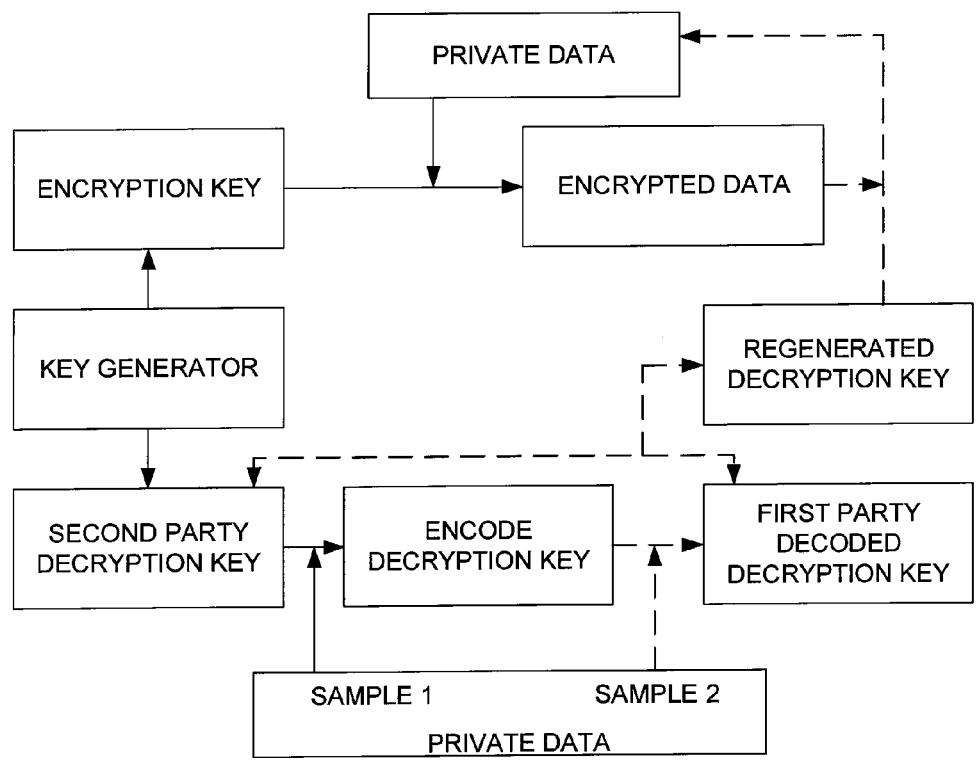
FIG. 5 is a schematic depiction of one method for reconstructing private data without revealing that data.

The source data of either party can be perfectly reconstructed by the other party if (1) their respective data is sufficiently similar and (2) a carefully scaled eigenvalue of the symmetric matrix representation of the source data is given. In other words, this scaled eigenvalue serves as the helper data—and the only data—that one party needs to share with the other party; thus the privacy of both parties is preserved. Generically, see FIG. 5 which schematically depicts the regeneration of a decryption key.

For example, consider $(d_1 \cdot d_1^T + d_2 \cdot d_2^T)x = \lambda_{d1} V_{d1} + \lambda_{d2} V_{d2}$, $d_1$ can be efficiently reconstructed—with an accuracy proportional to the closeness between $V_{d1}$ and $V_{d2}$—by the second party with $d_2, \lambda_{d2},$ and $V_{d2}$ when (i) the interior angle between $V_{d1}$ and $V_{d2}$ is less than 90 degree and (ii) the second party is given the bisector vector (x) and the value of $\lambda_{d1}/d_1^T \cdot x$, even when $\lambda_{d1}$ and $d_1^T$ which were used to calculate this value are not given. See the section entitled "Proof of theorem 4." Specifically, $d_1 = (\text{est\_}V_{d1}/|\text{est\_}V_{d1}|)(\lambda_{d1}/d_1^T x)$; where $$\text{est\_}V_{d1} = V_{d2} [|V_{d2}| \cdot \tan(2 \cos^{-1}(V_{d2} \cdot x/(|V_{d2}| \cdot |x|)))] \cdot [(x - V_{d2})/|x - V_{d2}|]$$

The angular deviation can be derived from $2 \cos^{-1}(V_{d2} \cdot x(|V_{d2}| \cdot |x|))$ or $2 \cos^{-1}(V_{d1} \cdot x(|V_{d1}| \cdot |x|))$. If bisector vector (x) is known (from step 110), each party with one's own eigenvector ($V_{d1}$ or $V_{d2}$) can derive the angular deviation. By collaborating to solve for bisector vector (x) in the algebraic system $(d_1 \cdot d_1^T + d_2 \cdot d_2^T)x = \lambda_{d1} V_{d1} + \lambda_{d2} V_{d2}$ while each party will keep one's data, eigenvalue and eigenvector private, each party can solve for either $e_1$ or $e_2$, thereby permitting each party to determine whether their data is sufficiently similar to the other party's data. Furthermore, the security and privacy will defer to the particular security and privacy of the two-party secure computation protocol for solving the algebraic system for the bisector vector (x). If the protocol for solving for the bisector vector (x) is secure, then the data of each of the parties is also secure.

The protocol (SIPPA) permits a first party to reconstruct source data of a second party when (1) the first party possesses some first party data that is a "sufficiently good approximation" of the second party's source data and (2) rather than revealing the second party's source data to the first party, only some helper data related to the Eigen components of the second party's source data is provided (by the second party) to the first party for reconstructing the second party's source data. The second party retains complete control over the sharing of helper data thus keeping private the second party's source data—based on the "closeness" between the first and second party's data. The second party can determine the "closeness" between the first party's data and the second party's data without the first party ever disclosing it's data to the second party—thus the privacy of both client and server data is respected. Only if the first party and second party's data are sufficiently close and the second party sends the first party the helper data, the first party can perfectly reconstruct the second party's source data. This method uses computational geometry that allows perfect data reconstruction from the solution of the bisector vector (x).

The party at issue can also send $(\lambda_d)^{0.5}$ as the helper data to allow perfect reconstruction for $d_1 = (est\_V_d/|est\_V_d|)(\lambda_d)^{0.5}$ because (1) $\lambda_d = d^T \cdot d = |d|^2$, (2) $d/|d| = V_d$ or $d = |d| \cdot V_d$, and (3) $est\_V_d/|est\_V_d| = V_d$ if we are to realize unconditional source data reconstruction.

First Exemplary Embodiment

Fingerprints

Figure 6:
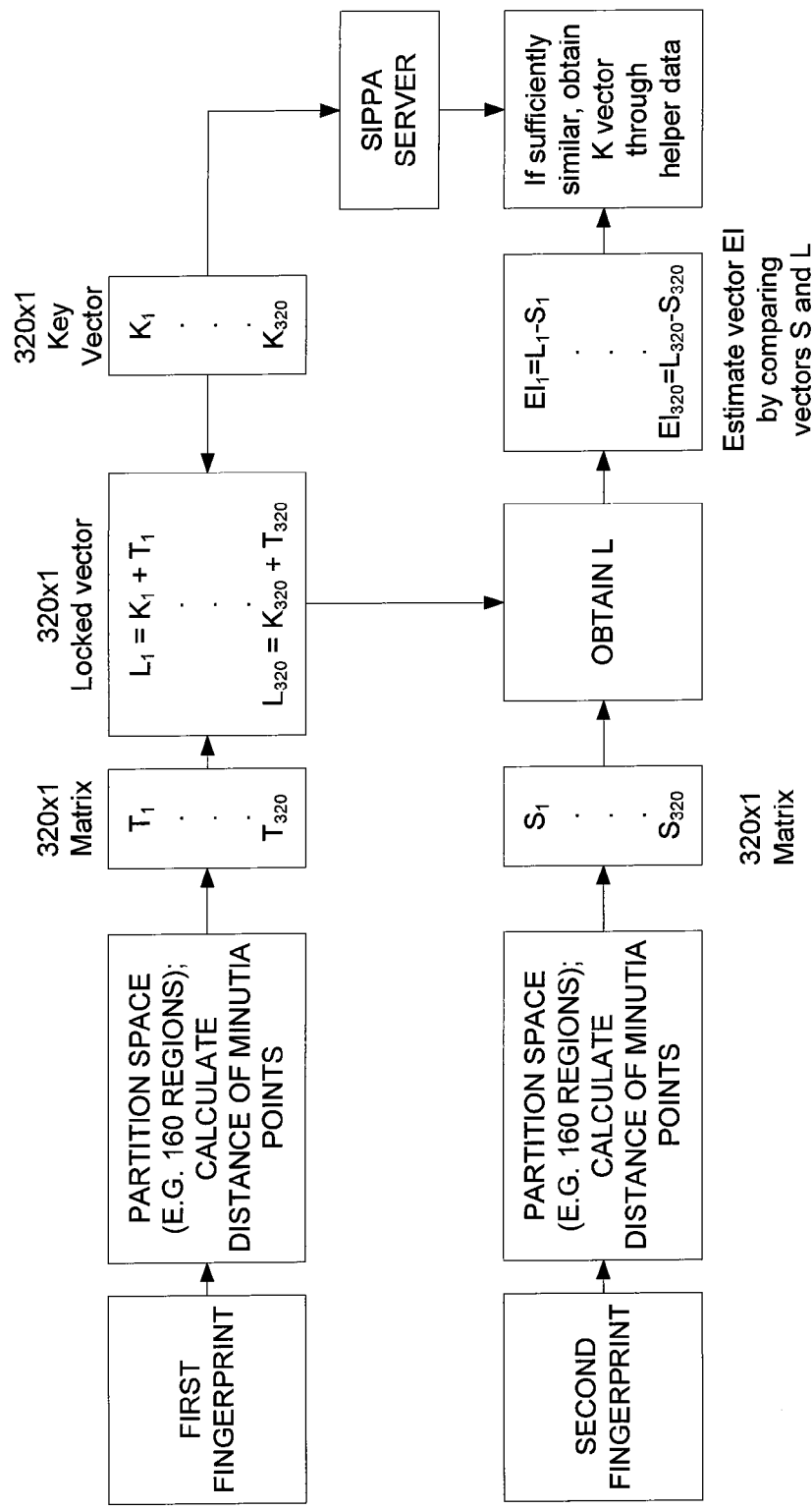
FIG. 6 is a schematic illustration of the locking and unlocking of a biometric fingerprint signature.

The first embodiment of this invention is privacy preserving fingerprint biometrics; more specifically, private reconstruction of fingerprint signatures represented by finger code format. For proof of concept, this invention is applied to, and its effectiveness is assessed by using, the publicly available CASIA-FingerprintV5 database. The database contains five different digital impressions of each finger from 500 subjects. Each of these fingerprint images were converted to custom finger code format (as described in FIG. 6), which yields a 320×1 vector. NEUROtechnology's VERIFINGER SDK was utilized to orient and extract minutia, core points from the fingerprint images. For each session, a random key of size 320×1 of integers in the range 0 and 255 (i.e., 320×256=81920 bits) was generated (K), to which the finger code vector (T) is added to obtain the vector (K+T). Party A possesses the key vector (K), whereas Party B possesses the vector (K+T). An impostor session is generated by subtracting the finger code vector of a finger other than (T) from (K+T) to yield (IM), whereas a true user session is generated by subtracting the fingercode vector of a different impression of (T) to yield (TU). SIPPA was utilized as the matching function which compares [(K) vs (IM)] or [(K) vs (TU)] where the similarity score can either be the angle between the securely computed vector (X) (vector X is the final output of SLSSP) and (K), or the Euclidean distance between the vector (X) and (K).

Performance Study of Fingerprint Reconstruction

An experiment was conducted to determine the performance of SIPPA with various vector sizes, i.e., the 320×1 vector was split into 10×1, 16×1 and 20×1 vectors. Each of these splits yields a vector $X_i$, 100 such experiments were conducted (dual-core 3 Ghz machine with 4 Gb RAM) with actual fingerprint data at each split size (10,16, 20).

Since SLSSP is theoretically guaranteed to produce a correct solution x, we conducted our experiment by replacing SLSSP with a standard linear algebra package (EJML) to solve for x in the algebraic system $(de \cdot de^T + dv \cdot dv^T) x = \lambda_{de} V_{de} + \lambda_{dv} V_{dv}$. The error between SLSSP's solution x, and the solution produced EJML was determined experimentally to be always less than 4.77E-8 in over 6800 trials. To assess SIPPA's ability to securely distinguish between True Users and Impostors we obtained over 20,000 unique True User sessions (20k-TU) and 20,000 unique Impostor sessions (20k-IM) from the extensive CASIA-FingerprintV5 database as described in the previous paragraphs. The ROC plot for (20k-TU) with (20k-IM) is provided in (FIG. 2) "SIPPA-2.0—Secure Information Processing with Privacy Assurance (version 2.0)," (Proc. of the 10th Annual Conference on Privacy, Security, and Trust, Paris, France, July). 2012. Parameters used in obtaining the ROC included, a SIPPA split dimension of 10×1, the 32 Angular Deviation (Ang) scores (AngGM(R−X)) per session was aggregated into one similarity score by obtaining their Geometric Mean. Experiments were also conducted at other split dimensions i.e. 15, 20; however they produced inferior or similar results with an exponentially increased processing times. Of the over 50,000 instances where helper data was sent to reconstruct the random key R, R was always reconstructed successfully except 6 instances out of the over 50,000 instances. Applicants postulate that this is due to the sensitivities in finite precision arithmetic. In these 6 instances, the number of errors in the 320 integers constituting the random key R ranges between one and four. To safeguard against this remote possibility, R can be encoded in error correction codes, allowing for correcting R when the reconstruction fails due to a few errors.

Second Exemplary Embodiment

Generation & Retrieval of Cryptographic Keys from Fingerprints

The generation and retrieval of cryptographic keys from fingerprints is another exemplary embodiment of this invention. The description here references the disclosure and the diagrammatic PPHM illustration in the provisional application 61/505,563.

A modified finger-code approach is used to represent a fingerprint as an attribute vector. Several concentric circles are extended from a chosen core point; these concentric circles are further divided into sectors. Each of the sectors forms the boundary of one coding region representing the fingerprint. The Euclidean distance of the farthest and closest minutia points within each coding region in relation to the core point is normalized to a value between 0 and 255. These values make up the above described attribute vector. The length of the attribute vector; i.e., the number and area of each coding region is a variable chosen for optimal performance.

In this embodiment, generation of a cryptographic Key utilizable with strong symmetric encryption algorithms such as AES256 is straightforward. The Key generation phase essentially involves generation of a vector called the k-vector, whose length exactly equals the attribute vector. The k-vector consists of a series of random integers between 0 and 255. A fingerprint template attribute vector (T) is obtained to lock the k-vector (K); elementary addition of the two vectors (K+T) produces the locked vector ($K_L$). The unlocking process begins by deriving an error laden version of K. This is done by procuring a fingerprint sample attribute vector (S), and elementary subtraction ($K_L$−S) to obtain an error laden k-vector ($K_E$). $K_E$ typically is not exactly identical to K. It cannot be directly utilized for the decryption of data encrypted with K. Measuring any physical object produces an error between measurements. Hence it is unlikely that matching minutia points in T and S will completely cancel each other during the locking and unlocking process.

Our secure computation protocol SIPPA described in this invention is utilized to determine the deviation between $K_E$ and K. If the party with $K_E$ deems sufficient similar, it will send helper data (as described elsewhere in this specification) which allows the party with $K_E$ to derive K.

A perfect copy of K is retained at a third party called the SIPPA server, and the SIPPA client engages with the SIPPA server utilizing $K_E$ to obtain a reconstruction of K, if the server deems similarity. SIPPA also guarantees that no infor-

Third Exemplary Embodiment

Emergency Health Data Retrieval

In another embodiment, the protocols described herein are used for emergency health data management on a smart-phone device. The description here references the disclosure of SIPPA based PPHM illustration in the provisional application 61/505,563.

In the enrollment process, the emergency health data of the individual is first encrypted and stored in the shared preference of his/her smart-phone device. Furthermore, the fingerprint of the individual, together with a random noise vector (N) generated by a third party, are used to encode the decryption key, and the encoded decryption key is also stored in the shared preference.

During the retrieval process, the emergency responder will first establish a WiFi connection with the individual's smart-phone device and retrieve the encrypted personal emergency health data and the encoded decryption key. The emergency responder will then use a built-in or wireless fingerprint scanner to capture the individual's fingerprint for decoding the decryption key. The decoded fingerprint is then transmitted to the third party for noise removal to arrive at a sufficiently close decryption key. The third party then acts as a SIPPA client to interact with the SIPPA server, and reconstruct the original decryption key based on the helper data provided by the SIPPA server. The reconstructed original key is sent back to the emergency responder for decrypting the personal emergency health data.

Proof of Theorem 1

Theorem 1: Consider $(d_1 \cdot d_1^T + d_2 \cdot d_2^T)x = \lambda_{d1} V_{d1} + \lambda_{d2} V_{d2}$, the solution $x=v$ satisfying $(d_1 \cdot d_1^T + d_2 \cdot d_2^T)v = \lambda_{d1} V_{d1} + \lambda_{d2} V_{d2}$ has a unity scalar projection onto the unity normalized $V_{d1}$ and $V_{d2}$, and is a bisector for the interior angle between $V_{d1}$ and $V_{d2}$.

Proof: By the definition of Eigen vectors and values, $d_1 \cdot d_1^T \cdot V_{d1} = \lambda_{d1} V_{d1}$. Since $d_1^T \cdot V_{d1}$ is a scalar, $d_1$ and $V_{d1}$ has the same directionality. Furthermore, $d_1/|d_1| = V_{d1}$ because $V_{d1}$ is a unity normalized vector. Similarly, $d_2/|d_2| = V_{d2}$, and the following results can be established:

$$d_1/|d_1| = V_{d1} \; d_1 \cdot d_1^T \cdot V_{d1} = \lambda_{d1} v_{d1} \Leftrightarrow (d_1/|d_1|) \cdot (|d_1| \cdot d_1^T \cdot V_{d1}) = (V_{d1})(\lambda_{d1}) \Leftrightarrow \lambda_{d1} = d_1^T \cdot d_1$$

$$d_2/|d_2| = V_{d2} \; d_2 \cdot d_2^T \cdot V_{d2} = \lambda_{d2} V_{d2} \Leftrightarrow (d_2/|d_2|) \cdot (|d_2| \cdot d_2^T \cdot V_{d2}) = (V_{d2})(\lambda_{d2}) \Leftrightarrow \lambda_{d2} = d_2^T \cdot d_2$$

To prove theorem 1, one must prove that (1) v has a unity scalar projection onto the unity normalized $d_1$ and $d_2$, and (2) V is a bisector.

To prove V has a unity scalar projection onto the unity normalized $V_{d1}$ and $V_{d2}$, it is sufficient to show $V_{d1} \cdot v = V_{d2} \cdot v = 1$, or $(d_1/|d_1|) \cdot v = (d_2/|d_2|) \cdot v = 1$. Since v is a solution to $(d_1 \cdot d_1^T + d_2 \cdot d_2^T)x = \lambda_{d1} V_{d1} + \lambda_{d2} V_{d2}$, the right hand side (RHS) and the left hand side (LHS) may be re-written as below:

$$LHS = (d_1 \cdot d_1^T + d_2 \cdot d_2^T)v = d_1 \cdot (d_1^T \cdot v) + d_2 \cdot (d_2^T \cdot v)$$
$$= |d_1| \cdot d_1 \cdot (d_1^T \cdot v / |d_1|) + |d_2| \cdot d_2 \cdot (d_2^T \cdot v / |d_2|)$$

$$RHS = \lambda_{d1} V_{d1} + \lambda_{d2} V_{d2} = d_1^T \cdot d_1 \cdot (d_1 / |d_1|) + d_2^T \cdot d_2 \cdot (d_2 / |d_2|)$$
$$= |d_1| \cdot d_1 + |d_2| \cdot d_2 \text{ because } d_1^T \cdot d_1 = |d_1|^2 \text{ and } d_2^T \cdot d_2 = |d_2|^2$$

Comparing the terms on the RHS and LHS, when $d_1$ and $d_2$ are linearly independent, $d_1^T \cdot v / |d_1| = 1 \Leftrightarrow (d_1/|d_1|) \cdot v = V_{d1} \cdot v = 1$ and $d_2^T \cdot V / |d_2| = 1 \Leftrightarrow (d_2/|d_2|) \cdot V = V_{d2} \cdot V = 1$. Therefore, v has a unity scalar projection onto the unity normalized $d_1$ and $d_2$. This completes the proof for (1). The scalar projection of V onto $V_{d1}$ is one, and so as the scalar projection of V onto $V_{d2}$. By the theorem of bisector, V is the bisector of the interior angle of $V_{d1}$ and $V_{d2}$. This completes the proof for (2).

Proof of Theorem 2

Theorem 2: Two-party secure computation involving left/right homomorphic encryption over square matrices is information-theoretic secure asymmetrically; i.e., one party has more information than the other under non-degenerative case.

Proof: Without the loss of generality, we consider the case of left homomorphic encryption in which P1 sends $E_L(k,A)$ to P2, and P2 returns $E_L(k,BA)$; whereas both A and B are both m×m matrices.

Referring to step 1 of algorithm 1, P2 receives from P1 m×m terms whereas each term is in form of $E(k,a_{ij})=k^{a_{ij}}$, where $i=1 \ldots m$, $j=1 \ldots m$. P2 observes m×m values sent by P1. But there are (m×m+1) unknowns (the additional term is due to the encryption key k).

Suppose the value range for each unknown is a set of n possible values, the expected information content revealed by an unknown, due to Shannon entropy, is then $-\Sigma_{i=1 \ldots n} P_i \log(P_i)$ where $P_i$ is the probability of the unknown assuming the $i^{th}$ value. Without any prior knowledge on the content of the matrix A and the encryption key k, each term can be assumed to be iid (independent and identically distributed) over its value range. Therefore, the chance of each unknown to assume a specific possible value is 1/n. As n approaches infinity, the expected information content gained by P2 is then:

$$\lim_{n \to \infty} \left[ -\sum_{i=1}^{n} P_i \text{Log}(P_i) \right] = 0.$$

Therefore, it is information-theoretic secure from P1's perspective. However, the content of matrix B is not information-theoretically secured under the homomorphic encryption over matrices. P1 receives m×m terms from P2; whereas each term after decryption is a linear combination of the matrix elements in B.

$$\left[ \left( \sum_{j=1}^{m} b_{ij} a_{jk} \right) \right]_{i,k \, | \, i=1 \ldots m, k=1 \ldots m}$$

Since there are only m×m elements in B and P1 receives m×m terms of which each is a linear combination of the m×m elements of B, P1 can fully reconstruct the content of matrix B unless the set of the linear combinations is degenerate. Or P1 will know the content of B held by P2, but P2 does not gain additional information from P1; thus the information-theoretical security is asymmetrical.

Proof of Theorem 3

Theorem 3: Two-party secure computation constructed by at least one composition of the product-of-exponentiation operations defined by the properties of left/right homomorphic encryption over square matrices is information theoretic secure for both parties.

Proof: Suppose P1 has a m×m matrix A, P2 has two m×m matrices B and C, we need to show that $E(k,A)^B E(k,A)^C$ is information-theoretic secure for both parties; i.e., P1 cannot learn the content of B nor the content of C, while P2 cannot learn the content of A.

By the properties in the definition for the left homomorphic encryption:

$$E_L(k, A)^B \cdot E_L(k, A)^C =$$

$$E_L(k, (B+C)A) = \left[\left(E\left(k, \sum_{j=1}^{m}(b_{ij}+c_{ij})a_{jk}\right)\right)_{i,k}\right]_{i=1\ldots m, k=1\ldots m}.$$

Upon the completion of the step in the algorithm for homomorphic encryption, P1 receives m×m terms from P2 while there are 2·m×m unknown terms. Therefore, P1 cannot learn the content of matrix B and that of matrix C. By theorem 2, P2 gains no information in the algorithmic step. Therefore, the composition of the product-of-exponentiation operations defined by the properties of left/right homomorphic encryption over square matrices is information-theoretic secure for both parties.

Proof of Theorem 4

Theorem 4 Consider $(d_1 \cdot d_1^T + d_2 \cdot d_2^T)x = \lambda_{d1}V_{d1} + \lambda_{d2}V_{d2}$, $d_1$ can be efficiently reconstructed—with an accuracy proportional to the closeness between $V_{d1}$ and $V_{d2}$—by a party with $d_2$, $\lambda_{d2}$, and $V_{d2}$ when (i) the interior angle between $V_{d1}$ and $V_{d2}$ is less than 90 degree and (ii) the party is given x and $\lambda_{d1}/d_1^T \cdot x$. Specifically, $d_1 = (est\_V_{d1}/|est\_V_{d1}|)(\lambda_{d1}/d_1^T x)$; where $est\_V_{d1} = V_{d2} + [|V_{d2}| \cdot \tan(2\cos^{-1}(V_{d2} \cdot x(|V_{d2}| \cdot |x|))) ] \cdot [(x-V_{d2})/|x-V_{d2}|]$ Proof: Let $x = V_{d1} + e1$ and $x = V_{d2} + e2$. The length of te (as shown in FIG. 3) can be derived, which is a vector with the same directionality as that of the vector $e_2$ when the interior angle between $V_{d1}$ and $V_{d2}$ is less than 90 degree. Specifically, $V_{d2}$ and $e_2$ are orthogonal (i.e., they are perpendicular of each other). The length of $te = |te| = [|V_{d2}| \cdot \tan(2\cos^{-1}(V_{d2} \cdot x/(|V_{d2}| \cdot |x|)))]$ because $e1 = e_2$ and the angle between $V_{d2}$ and $(V_{d2}+te)$ is twice the angle between $V_{d2}$ and x (theorem 1). Therefore, $te = |te| \cdot [e_2/|e_2|] = [|V_{d2}| \cdot \tan(2\cos^{-1}(V_{d2} \cdot x/(|V_{d2}| \cdot |x|)))] \cdot [e_2/e_2|]$. Since $V_{d2}+te(=est\_V_{d1})$ produces a vector with the same directionality as $V_{d1}$, and $V_{d1}$ is a unity normalized vector, one can conveniently derive $V_{d1}$ by normalizing $est\_V_{d1}$; i.e., $V_{d1} = est\_V_{d1}/|est\_V_{d1}|$. Finally, since $d_1 \cdot d_1^T x \approx \lambda_{d1} V_{d1}$, we can derive $d_1$ from $(\lambda_{d1}/d_1^T \cdot x) \cdot V_{d1}$ or $(\lambda_{d1}/d_1^T \cdot x) \cdot (est\_V_{d1}/|est\_V_{d1}|)$ with an approximation error proportional to the closeness between $V_{d1}$ and $V_{d2}$. Q.E.D.

Paillier Cryptosystem

The Paillier encryption scheme is a probabilistic, asymmetric, public-key cryptosystem whose security is based on the hypothetical intractability of the Decisional Composite Residuosity Assumption (DCRA). The Paillier encryption function PE(m, r), a bijection ($\mathbb{Z}_n \times \mathbb{Z}^*_n \to \mathbb{Z}^*_{n^2}$) encrypts a message m by raising a basis g to the power m, then multiplying $g^m$ with a random $r^n$ and reducing the product ($g^m \cdot r^n$) modulo $n^2$ where n is the public modulus. An important consequence of this approach is that the Paillier Cryptosystem is additively homomorphic, specifically the following properties hold:

$((PE(m_1,r_1) \cdot PE(m_2,r_2)) \bmod n^2) = PE(m_1+m_2, r_1 \cdot r_2)$         1.

$((PE(m_1,r_1) \cdot g^{m_2}) \bmod n^2) = PE(m_1+m_2, r_1)$         2.

$((PE(m_1,r_1))^{m_2} \bmod n^2) = PE(m_1 \cdot m_2, r_1)$         3.

Paillier Key Generation:
1. Choose a modulus n=p·q. The modulus is chosen in accordance with the RSAES-OAEP specification, where n has the properties of a well-chosen RSA modulus.
2. Choose a random $g \in \mathbb{Z}^*_{n^2}$ ensure that the order of g in modulo $n^2$ is a multiple of n, if not choose another g until the requirement is met.
3. Compute $\lambda = \lambda(n) = \text{lcm}((p-1), (q-1))$, where $\lambda(n)$ is the Carmichael function.
4. Let $$L(u) = \frac{(u-1)}{n},$$

compute $\mu = (L(g^\lambda \bmod n^2))^{-1} \bmod n$.

5. The Paillier public-key pair is (g, n).
6. The Paillier private-key pair is ($\lambda$, $\mu$).

The Paillier Encryption Function PE(m,r):

Given a Paillier public-key pair, choose a message to be encrypted $m \in \mathbb{Z}_n$, and a random r chosen uniformly from $\mathbb{Z}^*_n$, then the Paillier encryption function is defined as PE(m, r)=$(g^m \cdot r^n) \bmod n^2 \cdot$ PE(m, r) is a bijection ($\mathbb{Z}_n \times \mathbb{Z}^*_n \to \mathbb{Z}^*_{n^2}$) which produces a ciphertext ($c \in \mathbb{Z}^*_{n^2}$).

The Paillier Decryption Function PD(c):

Given a Paillier public-key, private-key pair and a Paillier ciphertext $c \in \mathbb{Z}^*_{n^2}$, then the Paillier decryption function is defined as:

$PD(c) = (L(c^\lambda \bmod n^2) \cdot \mu) \bmod n$

Fixed Point Representation

The Paillier cryptosystem operates over a finite field $\mathbb{Z}_n$, we extend the cryptosystem to operate over the reals utilizing a simple Fixed Point representation scheme. Let $s \in \mathbb{Z}$ be some exponent of 10, then for every $r \in \mathbb{R}$, r is represented as $(\lfloor 10^s r \rfloor) \in \mathbb{Z}$. An approximation of r, can be obtained by $$\tilde{r} = \frac{\lfloor 10^s r \rfloor}{10^s} \in \mathbb{R},$$

specifically:
1. For any $r \in \mathbb{R}^+$, a Paillier ciphertext is obtained by PE($\lfloor 10^s r \rfloor$, x), where x is some random and $$\tilde{r} = \frac{PD(PE(\lfloor 10^s r \rfloor, x))}{10^s}.$$

2. For any $r \in \mathbb{R}^-$, a Paillier ciphertext is obtained by $PE(n+\lfloor 10^s r \rfloor, x)$, where n is the Paillier modulus and $$\tilde{r} = \frac{PD(PE(n+\lfloor 10^s r \rfloor, x)) - n}{10^s}$$

It is to be noted that representing reals with a fixed point representation introduces errors due to truncation, which is directly proportional to the size of s chosen. The domain of the encryption function is also truncated from $\mathbb{Z}_n$ to $$\left\{0, 1, \ldots \left\lfloor \frac{n-1}{10^s} \right\rfloor\right\},$$

whereas extending the fixed point scheme to include negative reals further reduces the encryption domain to $$\left\{0, 1, \ldots \left\lfloor \frac{n-1}{2*10^s} \right\rfloor\right\}.$$

Since division operations are not properly defined in Paillier, we hold off on downscaling operations in the encrypted domain. A record of the change in scale is kept after each operation in the encrypted domain; this record is utilized to obtain r upon decryption of the result.

Homomorphic Matrix Addition and Multiplication with Encrypted Matrices

All matrix operations described in this section require knowledge of only the Paillier public-key pair (g,n). Encrypted matrices and vectors are denoted $[[M]]^{P(g,n)}$, $[[v]]^{P(g,n)}$ respectively, where each element of the matrix or vector is an element encrypted utilizing the Paillier public-key pair (g,n). Specifically, the decryption of any element $[[M]]_{i,j}^{P(g,n)}$ equals $M_{i,j}$ i.e. $M_{i,j}=PD([[M]]_{i,j}^{P(g,n)})$. The operator "[+]" denotes homomorphic addition of matrices or vectors; whereas the operator "[X]" represents multiplication of matrices, where one of the two matrices are encrypted.

In some embodiments, the identity of an individual is characterized by three facets: (i) what one knows, referred to as a UID (Universal ID)—a unique ID generated by the system based on personal information PID; e.g., phone number or birth date, (ii) what one has, referred to as a DID (Device ID) such as a personal mobile phone, and (iii) what one is, referred to as BID (biometric ID) such as the biometric voice, face or fingerprint. More specifically, the identity of an individual is a 3-tuple composed of DID, a biometrically encoded encryption key—BID+K, and the decryption of the encrypted hash on UID; where K is a key. Formally, an identity is then represented by a 3-tuple: <DID, BID+K, Dec(K, Enc(K, Hash(UID))>.

An interface gateway such as a voice gateway (VG), an Enrollment Module (EM) comprised of SIPPA server and a local database, and an Identity Storage and Verification Module (ISVM) comprised of SIPPA client and a centralized database are provided. In our design, the local database of the enrollment module will be the storage for the encryption/decryption key K. The centralized database will be the storage for the identity information. For privacy assurance, the EM and the ISVM do not directly share with each other the information in their databases. Furthermore, the two modules do not even have to treat each other as a trust worthy party. This is different from the traditional systems where the trustworthiness between the system components similar to that of EM and ISVM is assumed.

A significant technical effect of the disclosed methods is to provide an authentication system that incorporates privacy assurance with properties of (1) the identity of an individual is multi-facet and is based on what one knows (UID), what one has such as a mobile phone (DID), and what one is such as biometric voice signature (BID) and (2) A system that is fail-safe; i.e., it preserves the privacy of personal information—even if the system is compromised.

The disclosed approach towards the development of a fail-safe system is to employ a cryptographic key K to protect the confidentiality of the UID/DID. The cryptographic key is generated, used and discarded. It is never stored. Only the biometrically encoded encryption key K+BID+N is stored; where BID is a biometric identifier and N is a random noise. The key is regenerated based on the biometrics of an individual whenever it is needed. Given a noise-added biometric sample S+N, the pre-processing step of the regeneration is a simple cancellation operation; e.g., (K+BID+N)–(S+N).

By trivial inspection, the cryptographic key K can be perfectly regenerated in the pre-processing step if BID=S. However, personal biometrics can seldom be reproduced identically. Therefore, in general BID and S are different. When BID and S are from the same individual, the error incurred by BID–S is typically small. Otherwise BID–S is expected to be relatively large.

SIPPA is a two-party secure computation protocol where a client party can reconstruct source data of a server party when (1) the client party must possess some client data that is a "sufficiently good approximation" of the source data, in order to successfully reconstruct the source data and (2) rather than revealing the source data of the server party to the client party, only some helper data related to the Eigen components of the source data is provided (by the server party) to the client party for reconstructing the source data.

In one embodiment, the SIPPA client retrieves K+BID+N from the centralized database, and performs the cancellation (K+BID+N)–(S–N). K is stored in the local database of the SIPPA server. Through the execution of the SIPPA protocol, the SIPPA client will be able to reconstruct K if (K+BID–S) and K are sufficiently similar.

Exemplary Protocol for Identity Enrollment

An individual establishes connection through a secure authenticated channel to download client-side software such as an applet capable of biometric voice signature extraction and cryptographic key generation. The individual submits—through the downloaded client-side software—to the voice gateway a phone number that can be recognized as a caller ID for a call back. If the caller ID is valid and unique, the voice gateway signs the caller ID and calls the individual back. The voice gateway returns the signed version of the caller ID as the device ID–DID, as well as a token T (e.g. a random number or a timestamp). In addition, the voice gateway also sends T to ISVM.

The individual records a voice sample and uses the downloaded client-side software to extract the individual's voice signature as a biometric identifier—BID. The client-side software also generates a cryptographic key K. The cryptographic key K and DID–<DID, K>—are encrypted (using the public key of EM Enc($K^+_{EM}$, <DID, K>)) and sent to the Enrollment Module (EM) through a secure authenticated channel; and decrypted by EM (i.e., $Dec(K^-_{EM}, Enc(K^+_{EM}, <DID, K>))$) and stored upon receiving.

Three pieces of information are derived by the individual using the client-side software: Generate a UID using some personally known information and the token T, and then hash UID–Hash(UID); Encrypt the hash using K–Enc(K, Hash (UID)); Compute K+BID+N where N is some noise data. The 3-tuple <DID, K+BID+N, Hash(UID)> is encrypted and sent to the Identity Storage and Verification Module (ISVM) through a secure authenticated channel; and decrypted by ISVM upon receiving. The downloaded client-side software is terminated and discarded. K, UID, BID, and hash(UID) are also discarded. The individual retains only DID, T, and Enc (K, Hash(UID)).

It is noteworthy that the enrollment process described above does not rely on Certificate Authority to verify the identity of an individual. Instead, the enrollment process above allows an individual to create and self-sign an identity, whereas the process to bind an individual to a unique identity is based on what an individual has (e.g., mobile phone). It does not care the individual information that an individual may specify, since it is not relevant to the identity verification process. As such, two individuals could have, for example, the same name but different DID and BID. They will be identified as two different entities as distinguished by different 3-tuples.

Protocol for Identity Verification

An individual presents to voice gateway (VG) the DID and a noise-added biometric sample S+N. More specifically, DID and the noise-added biometric sample S+N may be encrypted by using the public key of SIPPA server and by using the public key of SIPPA client. In doing so, SIPPA server and SIPPA client can check the integrity of the information relayed by the voice gateway; i.e., DID and the noise-added biometric sample S+N are unaltered and original from the individual. Upon the information relayed by the voice gateway, SIPPA server obtains DID, and SIPPA client obtains S+N and DID. Based on DID, SIPPA client retrieves Hash (UID) from the centralized database. SIPPA client also retrieves (K+BID+N), and computes (K+BID+N)–(S+N).

The SIPPA protocol is executed for the SIPPA client to construct a secret key K'; e.g., SIPPA(client: (K+BID+N)–(S+N), server: k)→(client-result: K', server-result: similarity between K and K+BID–S); where K'=K if (K+BID+N)–(S+N) is sufficiently similar to K.

SIPPA client returns K' through the voice gateway to the individual for the individual to derive Dec(K', Enc(K, Hash (UID))). Compute Dec(K', Enc(K, Hash(UID))) (by individualSIPPA client). Present Dec(K', Enc(k, Hash(UID))) and the token T to ISVM for comparing against that stored in ISVM; ISVM accepts the claimed identity if Dec(K', Enc(K, Hash(UID))) is found identical to Hash(UID) of ISVM with a matching T during the authentication; whereas a matching T also provides an audit trail on how UID is generated and by which voice gateway the DID is returned.

Example

For proof-of-concept, an experimental study was conducted on a prototype of the proposed voice-based authentication system. In this experimental study, the test set consists of 90 calls from a pool of a dozen of individuals using three different phone models—with and without enabling the speaker phone mode.

Figure 7:
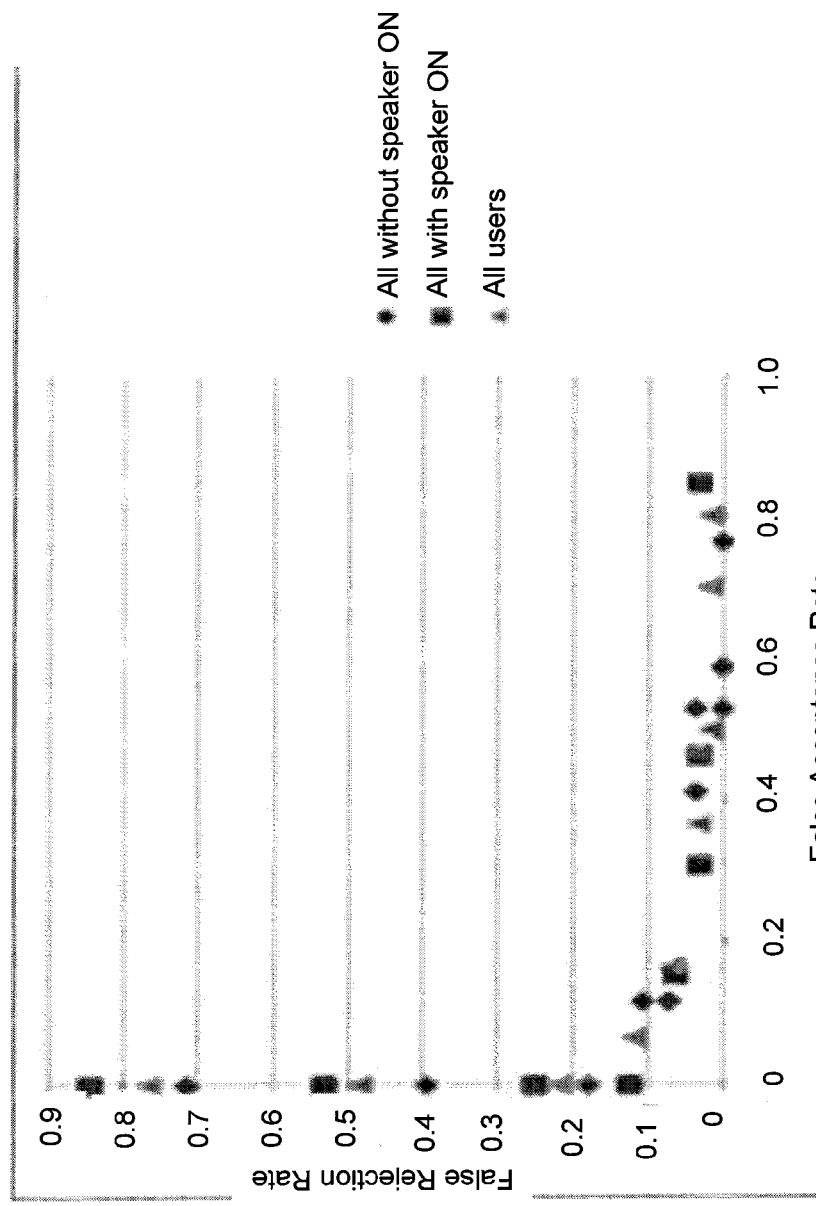
FIG. 7 is a plot of false rejection and false acceptance rates during voice authentication using a speaker.
Figure 8:
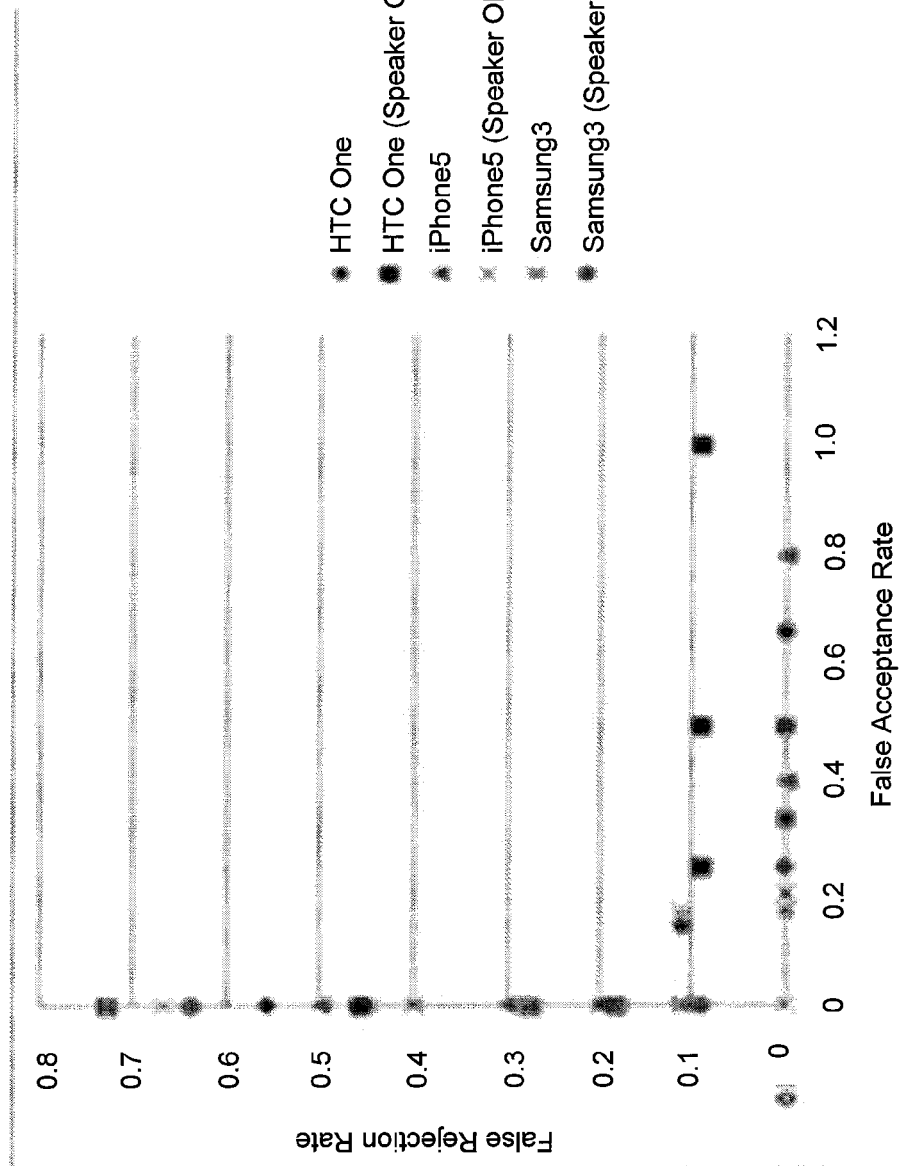
FIG. 8 is a plot of false rejection and false acceptance rates during voice authentication using different models of phones.

The results of this study are shown in FIG. 7 and FIG. 8 as ROC plots on false acceptance (FA) vs false rejection (FR). The plots in FIG. 7 are the changes in the ROC with the speaker phone mode enabled/disabled. The Equal Error Rate (EER) in all cases is about 0.1. The plots in FIG. 8 show different ROCs grouped by phone models; whereas the EER ranges from 0 (iPhone 5) to about 0.14 (HTC One).

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable non-transient signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A method for identity verification, the method comprising steps of:
    receiving, by a client computer from an interface gateway, a device identifier (DID) and a noise-added biometric sample ($S_1+N$) where $S_1$ is a biometric sample of an individual, N is noise, and the device identifier (DID) identifies a device that transmitted the noise-added biometric sample ($S_1+N$) to the interface gateway;
    retrieving from a database, by the client computer, an encryption key laden with noise-added biometric sample ($K_1+S_2+N$), where $S_2$ is a stored biometric sample corresponding to $S_1$, $K_1$ is a first key, the retrieving being based on the device identifier (DID), wherein the client computer does not know the first key ($K_1$) or the noise (N), and $S_1$ and $S_2$ are non-identical;
    computing, by the client computer, a second key ($K_2$) by solving $K_2=(K_1+S_2+N)-(S_1+N)$;
    determining whether or not the second key ($K_2$) is similar within a threshold to a stored value of the first key ($K_1$) located on a server computer without revealing the stored value of the first key ($K_1$) by computing, using the client computer and the server computer, a non-zero bisector vector (x) in the equation $(A_1+A_2)x=\lambda_{d1}V_{d1}+\lambda_{d2}V_{d2}$, where $A_1$ and $A_2$ are private matrixes corresponding to $K_1$ and $K_2$, respectively, $\lambda_{d1}$ and $\lambda_{d2}$ are respective eigenvalues and $V_{d1}$ and $V_{d2}$ are corresponding unity normalized eigenvectors, the computing occurring by exchanging encrypted matrix $A_1$; encrypted vector $\lambda_{d1}V_{d1}$; encrypted matrix $A_2$; and encrypted vector $\lambda_{d2}V_{d2}$ respectively, without the client computer or the server computer revealing $d_1$, $\lambda_{d1}$, $V_{d1}$, $d_2$, $\lambda_{d2}$ or $V_{d2}$;
    if the determining within the threshold is satisfied, the second key ($K_2$) and the stored value of the first key ($K_1$) are deemed sufficiently similar;
    if the determining within the threshold is unsatisfied, the second key ($K_2$) and the stored value of the first key ($K_1$) are deemed dissimilar;
    transmitting from the server computer to the client computer, if the threshold is satisfied, helper data that permits the client computer to reconstruct a secret key (K') identical to the first key ($K_1$) by combining the helper data with the private matrix $A_1$;
    transmitting, to the interface gateway, the secret key (K').

2. The method as recited in claim 1, wherein $K_1$ is not known by the client computer or the individual.

3. The method as recited in claim 2, wherein the device is a mobile cellular telephone or tablet computer.

4. The method as recited in claim 2, wherein the biometric sample of the individual is a voice biometric sample.

5. The method as recited in claim 2, wherein the biometric sample of the individual is a picture of a face.

6. The method as recited in claim 2, wherein the biometric sample of the individual is a fingerprint.

7. A non-transient program storage device readable by machine, tangibly embodying a program of instructions executable by machine to perform a method for identity verification, the method comprising steps of:
    receiving, by a client computer from an interface gateway, a device identifier (DID) and a noise-added biometric sample ($S_1+N$) where $S_1$ is a biometric sample of an individual, N is noise, and the device identifier (DID) identifies a device that transmitted the noise-added biometric sample ($S_1+N$) to the interface gateway;
    retrieving from a database, by the client computer, an encryption key laden with noise-added biometric sample ($K_1+S_2+N$), where $S_2$ is a stored biometric sample corresponding to $S_1$, $K_1$ is a first key, the retrieving being based on the device identifier (DID), wherein the client computer does not know the first key ($K_1$) or the noise (N), and $S_1$ and $S_2$ are non-identical;
    computing, by the client computer, a second key ($K_2$) by solving $K_2=(K_1+S_2+N)-(S_1+N)$;
    determining whether or not the second key ($K_2$) is similar within a threshold to a stored value of the first key ($K_1$) located on a server computer without revealing the stored value of the first key ($K_1$) by computing, using the client computer and the server computer, a non-zero bisector vector (x) in the equation $(A_1+A_2)x=\lambda_{d1}V_{d1}+\lambda_{d2}V_{d2}$, where $A_1$ and $A_2$ are private matrixes corresponding to $K_1$ and $K_2$, respectively, $\lambda_{d1}$ and $\lambda_{d2}$ are respective eigenvalues and $V_{d1}$ and $V_{d2}$ are corresponding unity normalized eigenvectors, the computing occurring by exchanging encrypted matrix $A_1$; encrypted vector $\lambda_{d1}V_{d1}$; encrypted matrix $A_2$; and encrypted vector $\lambda_{d2}V_{d2}$ respectively, without the client computer or the server computer revealing $d_1$, $\lambda_{d1}$, $V_{d1}$, $d_2$, $\lambda_{d2}$ or $V_{d2}$;
    if the determining within the threshold is satisfied, the second key ($K_2$) and the stored value of the first key ($K_1$) are deemed sufficiently similar;
    if the determining within the threshold is unsatisfied, the second key ($K_2$) and the stored value of the first key ($K_1$) are deemed dissimilar;
    transmitting from the server computer to the client computer, if the threshold is satisfied, helper data that permits the client computer to reconstruct a secret key (K') identical to the first key ($K_1$) by combining the helper data with the private matrix $A_1$;

transmitting, to the interface gateway, the secret key (K').

8. The program storage device as recited in claim 7, wherein $K_1$ is not known by the client computer or the individual.

9. The program storage device as recited in claim 8, wherein the device is a mobile cellular telephone or tablet computer.

10. The program storage device as recited in claim 8, wherein the biometric sample of the individual is a voice biometric sample.

11. The program storage device as recited in claim 8, wherein the biometric sample of the individual is a picture of a face.

12. The program storage device as recited in claim 8, wherein the biometric sample of the individual is a fingerprint.

\* \* \* \* \*